INVENTORS
RONALD N. KNUDSEN
BELA KERPER
BY
Browne, Schuyler & Beveridge
ATTORNEYS Dec. 3, 1968 R. N. KNUDSEN ET AL 3,414,103

SIGNAL RESPONSIVE AND SIGNAL GENERATING MEANS FOR
SINGLE ELEMENT PRINT HEAD TYPEWRITER

Filed March 31, 1966 11 Sheets-Sheet 2

INVENTORS
RONALD N. KNUDSEN
BELA KERPER

BY Browne, Schuyler & Beveridge
ATTORNEYS

INVENTORS
RONALD N. KNUDSEN
BY BELA KERPER
Browne, Schuyler & Beveridge
ATTORNEYS

*INVENTORS*
RONALD N. KNUDSEN
BELA KERPER

*BY*

Browne, Schuyler & Beveridge

ATTORNEYS

Dec. 3, 1968 R. N. KNUDSEN ET AL 3,414,103

SIGNAL RESPONSIVE AND SIGNAL GENERATING MEANS FOR SINGLE ELEMENT PRINT HEAD TYPEWRITER

Filed March 31, 1966 11 Sheets-Sheet 5

*INVENTORS*
RONALD N. KNUDSEN
*BY* BELA KERPER

Browne, Schuyler & Beveridge
ATTORNEYS

INVENTORS
RONALD N. KNUDSEN
BELA KERPER
BY
Browne, Schuyler & Beveridge
ATTORNEYS INVENTORS
RONALD N. KNUDSEN
BELA KERPER
BY
Browne, Schuyler & Beveridge
ATTORNEYS INVENTORS
RONALD N. KNUDSEN
BELA KERPER
BY
Brown, Schuyler & Beveridge
ATTORNEYS INVENTORS
RONALD N. KNUDSEN
BELA KERPER
BY
Browne, Schuyler & Beveridge
ATTORNEYS INVENTORS
RONALD N. KNUDSEN
BELA KERPER
BY
Browne, Schuyler & Beveridge
ATTORNEYS INVENTORS
RONALD N. KNUDSEN
BY BELA KERPER
Browne, Schuyler & Beveridge
ATTORNEYS

United States Patent Office 3,414,103

Patented Dec. 3, 1968

3,414,103

SIGNAL RESPONSIVE AND SIGNAL GENERATING MEANS FOR SINGLE ELEMENT PRINT HEAD TYPEWRITER

Ronald N. Knudsen, Alexandria, Va., and Bela Kerper, Hillside, Md., assignors, by mesne assignments, to Epsco, Incorporated, Westwood, Mass., a corporation of Massachusetts Filed Mar. 31, 1966, Ser. No. 539,075
18 Claims. (Cl. 197—20)

ABSTRACT OF THE DISCLOSURE

This invention relates to devices and circuitry for both sensing character and function operations and controlling such operations in a standard IBM Selectric Typewriter. Electrical signals, generated in response to the sensed operation of characters and typewriter functions, are used to perforate tape, control other typewriters or as input to data processing systems. Code signals from tape readers, other typewriters or data processing systems may control character and function operation of the typewriter.

This invention relates generally to electric typewriters and specifically to electrical circuits and structures enabling an electric typewriter to operate in conjunction with coded tapes and/or other typewriters.

Many circumstances arise where it is desirable to operate an electrical typewriter automatically. Some businesses, for example, send out large numbers of letters which are substantially alike. Quite often, because of professional standards, use of copying machines is undesirable. In such instances, it is advantageous to use a typewriter system interconnected in a master-slave arrangement, or a single or multiple typewriter system which can be controlled by a pre-punched tape.

Further, in view of the present extensive use of commercial data processing, it is desirable to have a typewriter capable of serving as an input-output device for computers or data communication systems.

Several products are currently available which can serve some or all of the above functions. Most, however, are quite expensive and large in size. Also, most can be used as a data unit only and are incapable for use as a standard typewriter.

This invention comprises the addition of circuits and mechanical structures to a standard electric typewriter of the movable typing-head type to produce a device capable of operation in conjunction with other similar units in a master-slave system or in conjunction with coded data systems or coded tapes. The invention is relatively inexpensive to produce and is operable by persons with virtually no special training. Unlike most previous products, it operates quietly. Its modular construction results in a unit which occupies substantially the same space on a desk top as a standard typewriter. Moreover, when the typewriter of this invention is not being used in one of the special systems described above, it may be used for normal typing. This feature is particularly important to small offices or other operations which desire to invest a minimum amount of capital in office machines.

In accordance with this invention, a standard electric typewriter is modified so that all typing operations, both character and functional, may be controlled from an outside source, such as coded tape, data lines or another similar typewriter. Further, means for sensing all character and functional typing operations are built into the typewriter so that normal typing may control other typewriters or produce coded tapes or cause data to enter other systems.

It is accordingly an object of this invention to enable control of an electric typewriter from an outside source.

It is a further object of this invention to provide a typewriter capable of controlling other similar typewriters.

It is another object of this invention to provide a typewriter which can prepare coded tapes for future use on similar machines.

It is a further object of this invention to provide an electrical typewriter which will be compatible with other data systems, such as data communication lines and computers.

Other objects and advantages of this invention will become readily apparent from consideration of the following specification and the attached drawings, wherein.

GENERAL DESCRIPTION

In its preferred embodiment, this invention comprises the addition of electrical circuits and mechanical structures to electric typewriters of the type having a stationary printing surface and a movable typing head. Such a typewriter is disclosed and claimed in United States Patents Nos. 2,879,876 to Palmer et al. and 2,919,002 to Palmer, both assigned to International Business Machines Corporation. These two patents, and the patents cited therein, are specifically cited herein for reliance as disclosure. In this specification, the only description of the typewriters disclosed in the patents listed above will be that necessary to the explanation of construction and operation of the circuits and structures of this invention.

Throughout this specification, reference will be made to the typewriter "keyboard characters" or "character cycles" and typewriter "functions." "Characters" refer to any figures actually printed by the typewriter. "Functions" refer to Tabulation, Spacing, Shift, Backspace, Index and Carriage Return operations.

Figure 1:
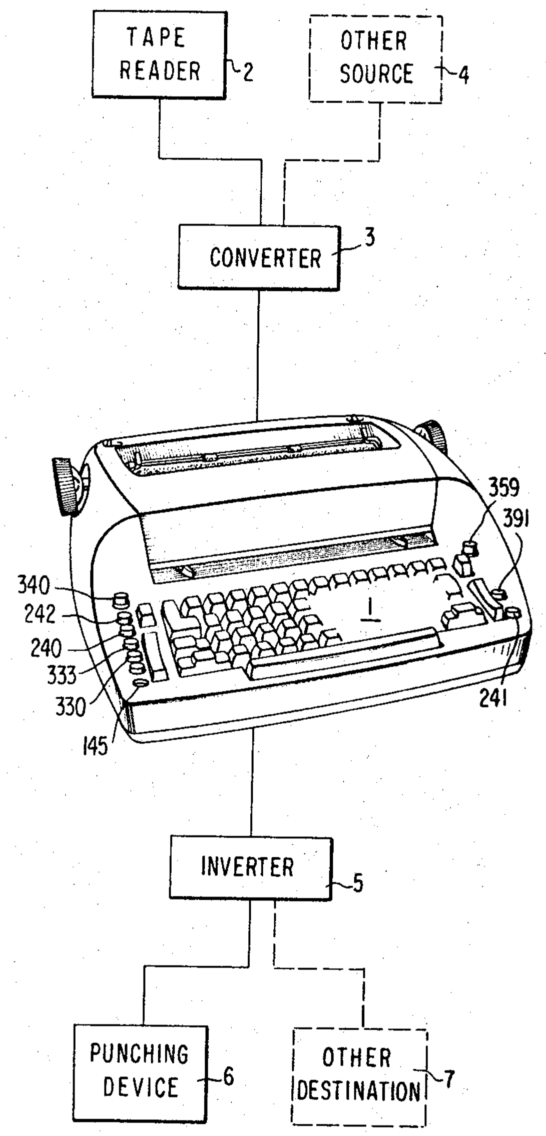
FIG. 1 shows the modified typewriter in combination with input-output devices.

Referring to FIGURE 1, a movable printing head typewriter 1 is shown in combination with some of the circuits and structures of this invention. As will be explained in detail below, typewriter 1 may be controlled by data on tape read by tape reader 2. Code on the tape is converted by converter 3 to a code acceptable by the control system within typeyriter 1. Other sources 4, represented by the dotted outline, may also feed coded data to the typewriter. Other sources 4 may take the form of other tape readers, each keyed to sequentially or selectively present data to the typewriter. Or, other sources 4 may be data lines from a source far removed from the typewriter. Further, other sources 4 may take the form of a computer or accounting machine output bus. It is only necessary that different converter circuits be utilized to convert whatever code is received to the parallel code which is recognized by the typewriter control circuitry.

Separately, or in conjunction with the data input described above, the typewriter of this invention may be used to originate data. Normal typing on the keyboard generates coded impulses which are transferred to inverter 5 for inversion to whatever code is desired. The inverter output may be used to drive punching device 6 to prepare a punched tape for future use in tape reader 2.

As previously mentioned, one important application of this invention is the preparation of tapes corresponding to "form" letters by typewriter 1 and punching device 6. Thereafter, each time such a letter is desired, the tape is fed into tape reader 2 and one or more copies are typed. The typing speed of the system is limited only by the mechanical limitations of the typewriter.

Other destinations 7, represented by the dotted outline, could take the form of other punch devices or any type of data system capable of acceptance of data generated by typewriter 1.

Figure 2:
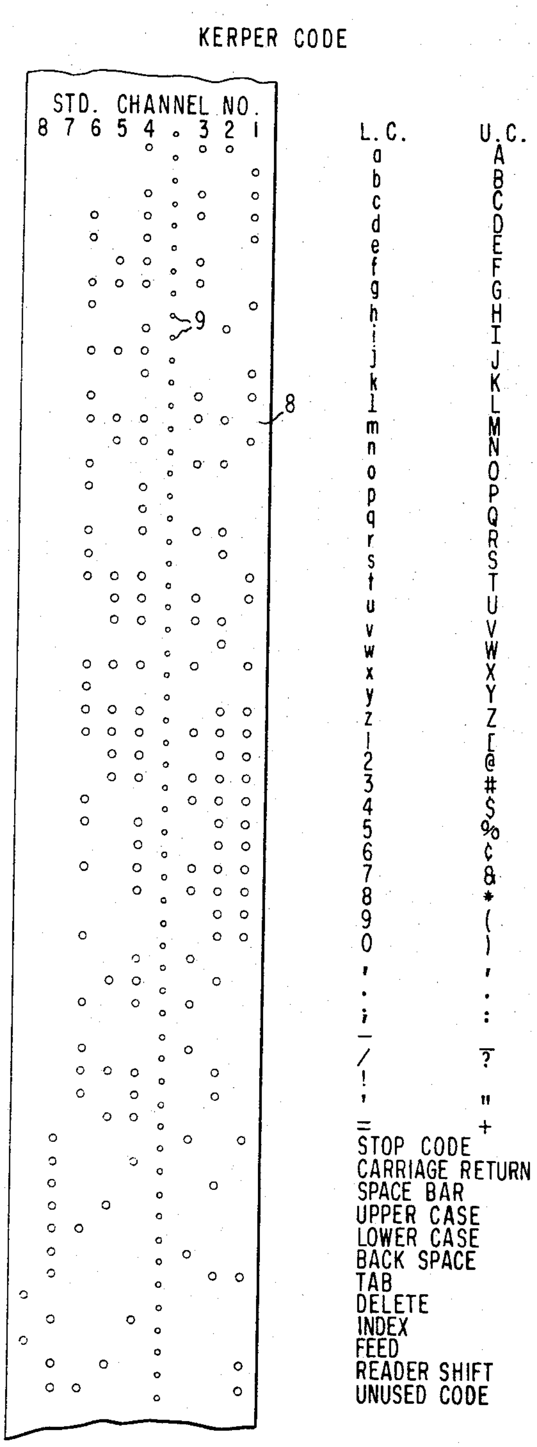
FIG. 2 illustrates a code for use with this invention.

Instead of feeding coded impulses to inverter 5, typewriter 1 could be directly connected to the control inputs of other similar typewriters. Such a master-slave system would produce as many original copies as typewriters during the time necessary to type one copy manually or to receive data from any source such as type reader 2. FIGURE 2 illustrates a code which may be used on punch tape for feeding to tape reader 1. Tape 8 is a standard eight channel tape having eight possible data positions or channels and drive sprocket holes 9. The code illustrated will be discussed in detail below.

According to the preferred embodiment of this invention, the Kerper code illustrated in FIGURE 2 may be converted by converter 3 and used to control typewriter 1. Also, normal keyboard operation may be inverted to Kerper code by inverter 5 and generates a punch tape in punching device 6.

Both tape reader and tape punch are standard equipment readily available. The punch is a Model 500 eight channel punch manufactured by Royton Industrial Products Division of Litton Industries. The reader is manufactured by the same company and is designated Model 550.

Two separate electro-mechanical systems are built into the typewriter in accordance with this invention. One senses all typing operations, both keyboard character and function. This system feeds data to an output device, such as a punch, through inverter 5. The second system controls the typing operation in response to code read by tape reader 2 or received from any other source 4.

KEYBOARD SENSING CONTROL

Figures 5, 6:
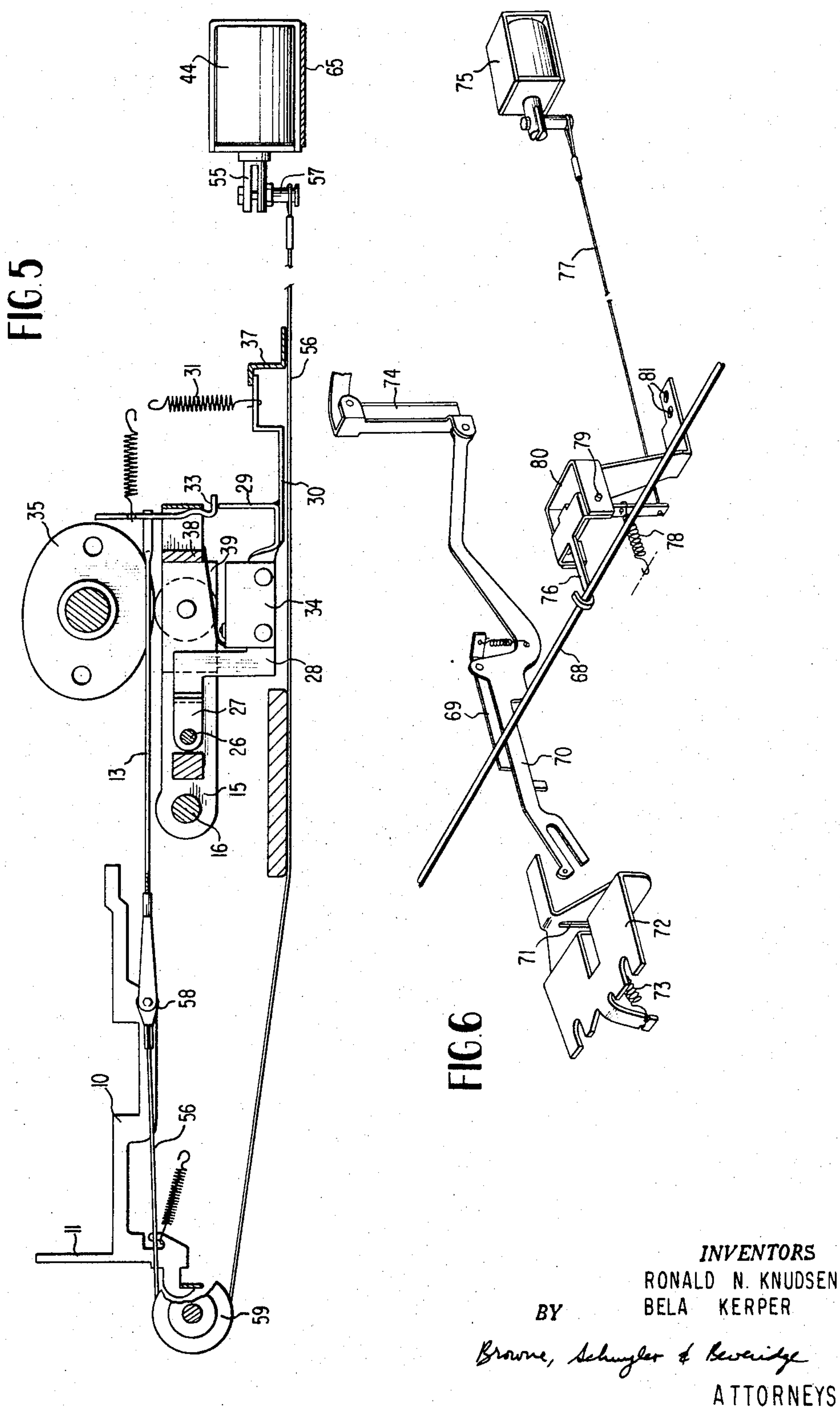
FIG. 5 is a side view of the character sensing and control system of FIG. 4.
FIG. 6 illustrates the cycle clutch control system of this invention.

In the movable printing head type typewriter, each stroke of a character key is converted to a unique six position code which is used to rotate and tilt the typing head. Referring to FIG. 6 of Patent No. 2,919,002 to Palmer, each key lever (42) depression causes an interposer (55) to be struck by the filter shaft (133) and propelled in a short stroke toward the keyboard of the machine. Lugs (81–86) depending from the lower edge of the interposer engage a combination of six rods (70–75) which extend transversely across the typewriter. Contact with the lugs causes transverse portions of the selected rods to pivot toward the keyboard of the typewriter.

Figure 4:
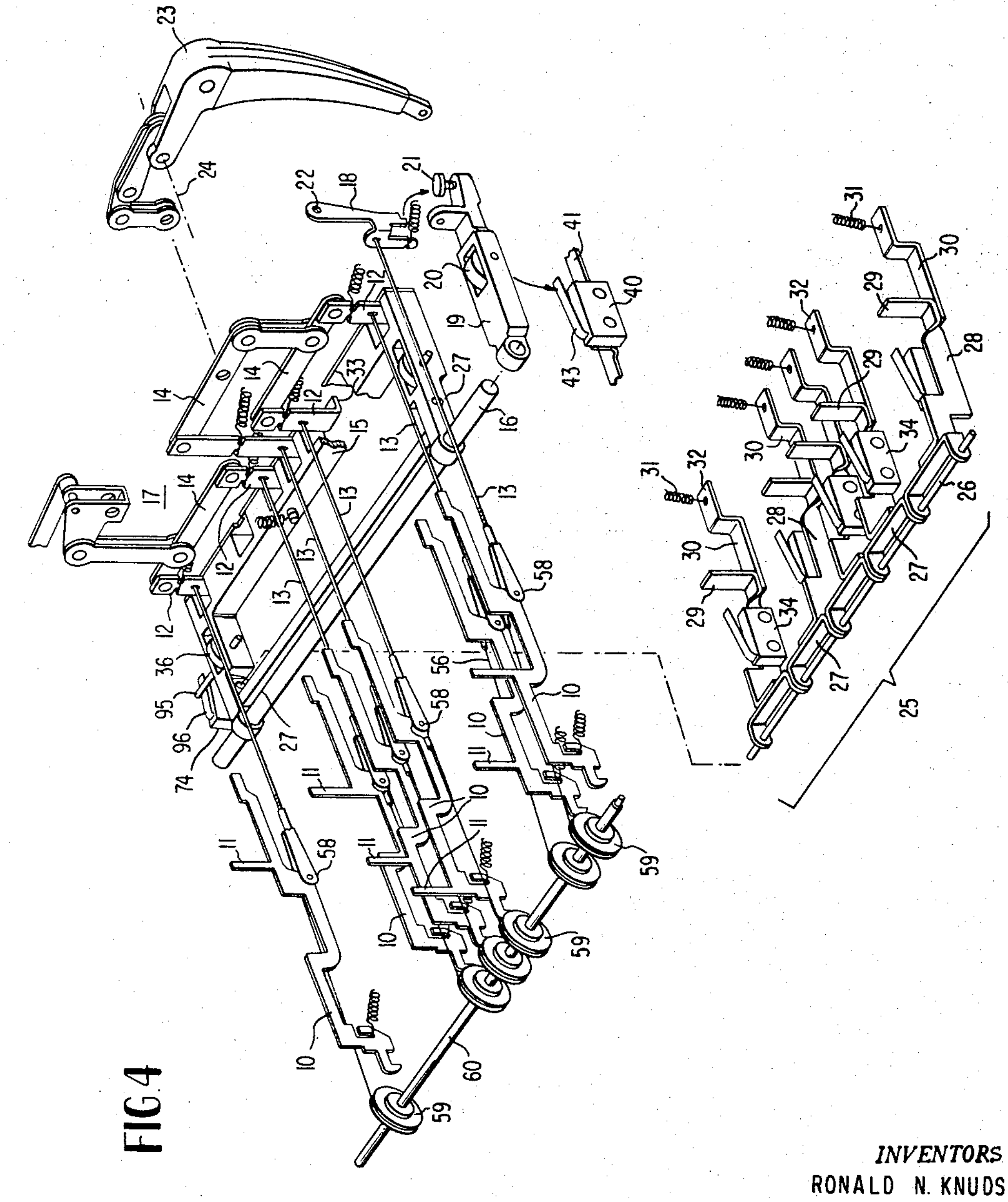
FIG. 4 illustrates the character sensing and control system.

Referring now to FIG. 4 herein six latch interposers 10 have vertical projections 11 rising at different points from their upper edges. As the rods referred to above are caused to pivot toward the keyboard of the typewriter, they contact certain of the vertical projections 11 on latch interposers 10. Conseqently, the selected (contacted) latch interposers are moved toward the front of the typewriter. Each character key selection causes a different combination of latch interposers 10 to move. Each latch interposer 10 is connected to a selector latch 12 by interposer rods 13. Each selected latch interposer 10 pulls its selector latch 12 toward the front of the typewriter, pivoting the latch about its upper portion where it is loosely connected to the corresponding floating link 14.

Each time a character key is depressed, latch bail 15 pivots downwardly about bail shaft 16. Selector latches 12 which are not selected are pulled downward with the latch bail, changing the effective configuration of differential 17 and causing the typing head to rotate or tilt, moving a different character opposite the printing surface. If one of the selector latches has been selected, that is pivoted toward the front of the machine by its latch interposer 10, it will not be caught and moved by the latch bail on the latter's downward excursion.

Five of the six latch interposers 10 work in conjunction with their corresponding selector latches in the same fashion; each of the latches is positioned, if not selected by the latch bail 15. The sixth latch interposer, connected to selector latch 18, operates differently. The 5-Unit cam bail 19 is pivotally mounted on bail shaft 16. An eccentric cam (FIG. 5 of the Palmer patent, element 199) bears against roller 20, holding 5-Unit cam bail 19 in its downward position when differential 17 is at rest. Each time a keyboard character key is depressed, the cam rotates one-half turn and would allow bail 19 to pivot upwardly. However, selector latch 18 impacts against pedestal 21 and holds 5-Unit cam bail 19 in its downward position. If, however, selector latch 18 has been selected, that is, pivoted toward the front of the typewriter about its pivot point 22, then bail 19 is free to pivot upwardly, again changing the configuration of differential 17. A vertical link connects bail 19 to rotate bell crank 23 at its axis 24, but has been omitted from FIG. 4 for clarity.

The above-described structure is present on the standard electric typewriter. Following is a description of a portion of the modification in accordance with this invention.

Figure 3:
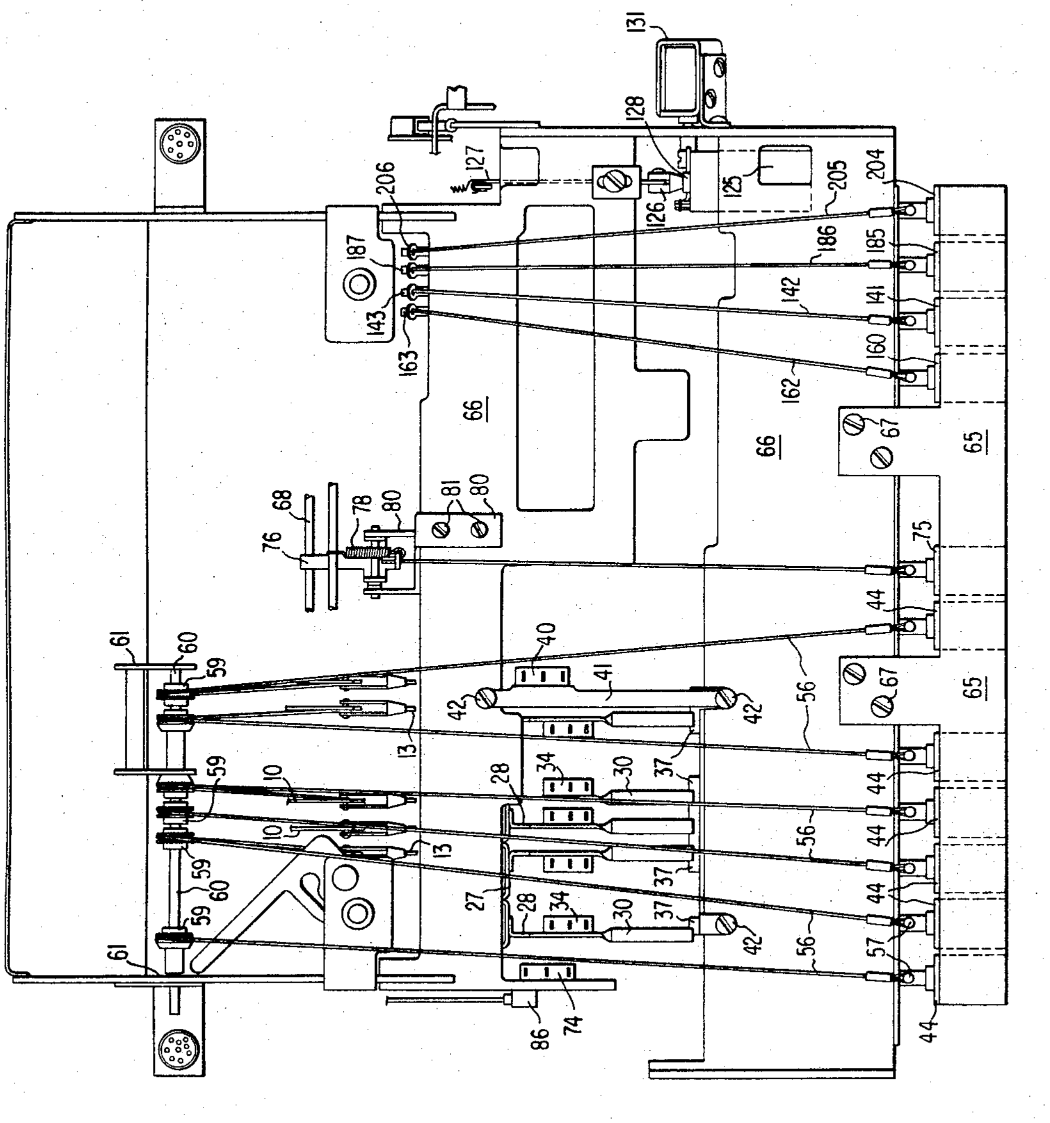
FIG. 3 is a view of the underneath portion of the modified typewriter of this invention.

Sensing assembly 25 senses the selected configuration of five of the six selector latches, in accordance with this invention. Switch shaft 26 is mounted between apertures 27 bored in latch bail 15. Five switch-assembly hinges 27 are independently mounted end to end on switch shaft 26 within the side arms of latch bail 15. Connected to each switch-assembly hinge is a switch mount 28, each having an upwardly extending latch post 29. Spring mount 30 is connected to each switch mount and holds each switch mount in its uppermost position by springs 31 causing spring mounted hinge 32 to be held against stop 37 (FIG. 5). Stop 37 is permanently attached to an edge of the underneath side of main frame 66 of typewriter 1 (FIGURE 3). Each latch post 29 is sized such that its upper tip extends to a height adjacent the lower foot 33 of each selector latch 12 (FIGURE 5). Sensing switches or contacts 34 are mounted on each switch mount 28.

Operation of this portion of sensing assembly 25 may be seen by reference to FIGURE 5. Each time a keyboard character key is depressed, latch bail 15 pivots downwardly about bail shaft 16. This downward excursion is caused by the one-half revolution of cam 35 acting against roller 36 set within the side rail of latch bail 15. As latch bail 15 travels downwardly, lower foot 33 of selector latch 12 contacts and pushes against the upper tip of latch post 29, causing the relative position of latch bail 15 and switch 34 to remain unchanged. However, if the particular character key depressed caused the selection of the latch interposer 10 shown in FIGURE 5, then selector latch 12 would have been pivoted to the left. Under this condition, when latch bail 15 travels downwardly, lower foot 33 of latch 12 does not impact against the upper tip of latch post 29. Instead, since the switch mount is held in its upward position by switch assembly spring 31, the lower edge 38 of latch bail 15 depresses switch arm 39 of switch 34, closing the circuit therein.

In summary, referring to FIGURES 4 and 5, with each keyboard character key depression, cam 35 undergoes a one-half rotation. Latch bail 15 is accordingly pivoted downwardly about bail shaft 16. Depending upon which character key is depressed, certain of the selector latches 12, 18 would have been pivoted toward the keyboard by their corresponding latch interposer 10. Each of the selector latches 12 that were not pivoted, push latch post 29 of its corresponding switch assembly downward. This causes the relative position of its corresponding switch and latch bail 15 to remain unchanged. Each selector latch that is pivoted toward the front of the typewriter fails to push its corresponding latch post downward. In those instances, the corresponding switch or switches 34 are closed by lower edge 38 of bail 15 striking switch actuator arm 39. Since each switch assembly hinge 27 acts free of the other switch assembly hinges, the closed switches correspond exactly to the selected pattern of five of the six latch interposers 10.

Operation of five of the six sensing switches was described above. The sixth switch, acting in conjunction with the 5-Unit cam, operates differently. Referring again to FIGURE 4, it is remembered that 5-Unit cam bail 19 moves upward only when selector 18 has been selected, that is, pivoted out of the way of pedestal 21. The 5-Unit cam switch 40 is mounted on switch mount 41 which is fixedly held by screws 42 to main-frame 66 of the typewriter (FIGURE 3). Roller 20 of 5-Unit cam bail 19 bears against actuator arm 43 of switch 40 when the five unit cam bail is not selected. When bail 19 does pivot upwardly, actuator arm 43 also moves, causing the circuit within switch 40 to close.

Operation of the typewriter keyboard selection control is best explained with reference to FIGURE 5. It will be remembered that each keyboard character has a unique combination of latch interposers which are selected and pivoted. Incoming code signals are converted to a possible six bit parallel code for energizing the keyboard selection control. Each bit, or impulse, is applied to an interposer solenoid 44. Plunger 55 of each solenoid is connected to an interposer line 56 via an offset post 57. A received bit, or impulse, causes plunger 55 to be pulled into interposer solenoid 44. Interposer line 56 is connected to interposer 10 at pin 58 around interposer pulley 59. Each energization of interposer solenoid 44 thereby causes latch interposer 10 to be drawn to the left in FIG. 5. Latch 12 is thereby pivoted to the left as in normal typing operation.

Construction of the interposer pulley assembly may be seen in greater detail in FIGURE 4. Each interposer pulley 59 is mounted on pulley shaft 60 and is free to rotate thereon. Pulley shaft 60 is mounted on main frame 66 of the typewriter by shaft brackets 61 (FIGURE 3).

Arrangement and mounting of interposer solenoids 44 may be seen by reference to FIGURE 3. Each interposer solenoid 44 is fixedly mounted on solenoid plate 65 attached to main frame 66 of the typewriter by screws 67.

A very important saving in space is obtained by utilizing the configuration of this invention. Solenoid mounting plate 65 is mounted on approximately the same plane as the bottom plate of the typewriter main frame 66. All of the sensing switches 34, 40 are mounted within the typewriter mechanism. Accordingly, the only extensions outside of the standard typewriter case necessary with this invention is the quite small solenoid mounting plate 65' (See FIGURE 8.) Accordingly, almost no extra space is occupied by the typewriter system of this invention as compared to a standard typewriter of the same type.

CYCLE SENSING AND CONTROL

As explained above in connection with the explanation of the operation of the keyboard character sensing and control (FIGURES 4 and 5) it is necessary that latch bail 15 be pivoted downwardly about bail shaft 16 for each character which is to be typed. Referring to FIG. 5, positive cam 35 actuates latch bail 15 by executing a half revolution on each character cycle. In the normal operation of the typewriter, each depression of a keyboard character key causes a clutch to be closed which connects positive cam 35 to a constantly running motor for the duration of the character cycle. A portion of the typewriter mechanism for this purpose is shown in FIGURE 6 herein.

As illustrated in FIGURE 6 of Patent No. 2,919,002 to Palmer, each interposer has a downwardly extending lug (309) bearing against cycle bail (310). As each interposer is initially pushed downward by a key lever (42) in the typewriter of that patent, cycle bail (310) is actuated, causing the cycle clutch to close.

Referring to FIGURE 6 herein, a portion of the cycle bail 68 is shown. Each downward excursion of cycle bail 68 causes cycle clutch latch pawl 69 to be depressed. Clutch cycle latch link 70 is then pulled to the left in FIG. 6 through aperture 71 of cycle clutch keeper 72 by spring 73. This causes cycle clutch latch 74 to move away from the spring actuated cycle clutch, causing positive cam 35 (FIGURE 5) to engage and rotate one-half turn.

Figure 7:
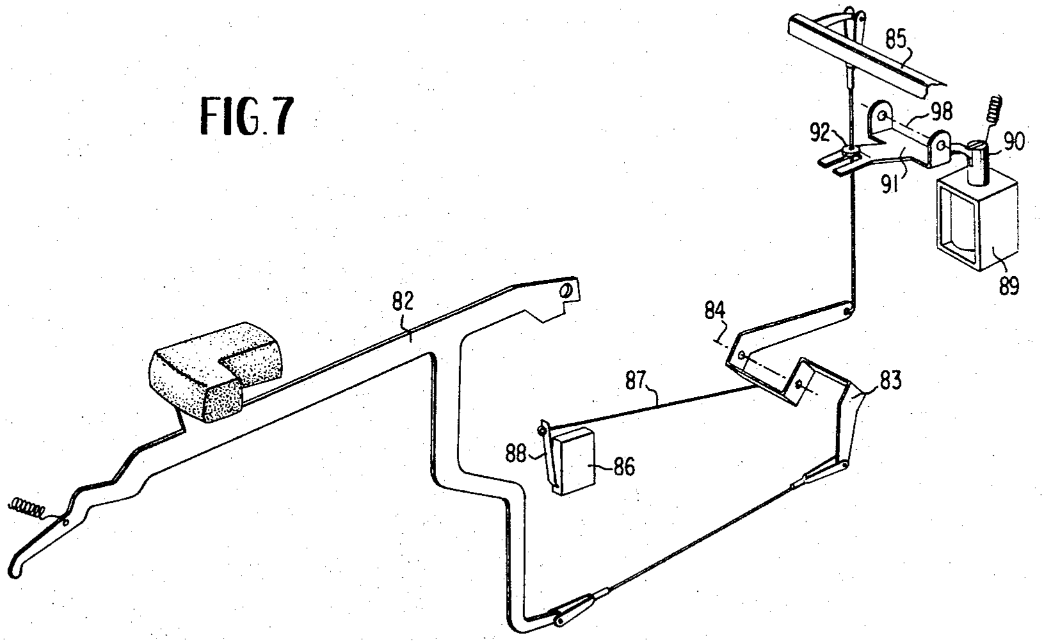
FIG. 7 shows the standard tabulator linkage and the added sensing and control devices of this invention.

Operation of this portion of the standard typewriter may be seen more clearly by reference to FIGURE 7 of the Palmer patent and the accompanying description therein.

Sensing of each character cycle in accordance with this invention is accomplished by the actuation of sensing switch 74 by each downward excursion of latch bail 15 (FIGURES 3 and 4). Referring to FIGURE 4, each time latch bail 15 pivots downwardly, which it must do for each character cycle, pin 95, extending through the side arm of latch bail 15, strikes actuator arm 96, causing the switch to close, thereby signalling a character cycle.

The clutch cycle control according to this invention is shown in FIGURE 6. Clutch cycle solenoid 75 is connected to the generally L-shaped cycle bail actuator 76 via actuator line 77. Actuator spring 78 normally holds cycle bail actuator 76 in an upward position. However, whenever received code impulses indicate a character cycle, cycle solenoid 75 is energized, pivoting cycle bail actuator 76 about shaft 79 and causing cycle bail 68 to be pulled downwardly. Thereafter, the cycle clutch operates as in normal keyboard operation. Cycle bail actuator 76 is pivotally mounted in actuator housing 80 which is fixedly attached to lower plate 66 of the typewriter main frame by screws 81 (FIGURE 3). Referring to FIGURE 3, cycle solenoid 75 is mounted on solenoid plate 65 alongside interposer solenoids 44.

In summary, cycle bail 68 must be depressed each time a character is to be printed by the typewriter. Sensing of each character cycle is accomplished by sensing switch 74 which is closed by each downward excursion of latch bail 15. Cycle clutch control by received code impulses is accomplished by energization of cycle solenoid 75 which depresses cycle bail 68 by causing rotation of cycle bail actuator 76.

TABULATOR SENSING AND CONTROL

One of the typewriter functions is tabulation. Operation of this keyboard function key causes the printing head to be moved from left to right across the typing surface by a predetermined amount. Referring to FIGURE 7, each depression of tabulator key lever 82 causes tabulator bell crank 83 to rotate counterclockwise about axis 84. This in turn causes counterclockwise rotation of tab torque bar 85 and results in movement of the printing head from left to right across the typewriter printing surface.

Sensing of each tabulating function is accomplished by tabulating switch 86. Sensing switch 86 is mounted vertically on the outside of the typewriter main frame (FIGURE 3). Each partial rotation of tabulator bell crank 83 causes switch link 87 to pull actuating arm 88 of tabulating sensing switch 86 and thereby close the switch indicating a tabulation function.

When received coded impulses indicate that a tabulation is to be performed, tabulating solenoid 89 is impulsed. Downward movement of plunger 90 causes tabulating yoke 91 to move clockwise about axis 98, striking disc 92 on the standard tabulating linkage. Clockwise rotation of tabulation yoke 91 causes opposite rotation of tabulation torque bar 85 and the tabulation function is accomplished in the usual manner.

Figure 17:
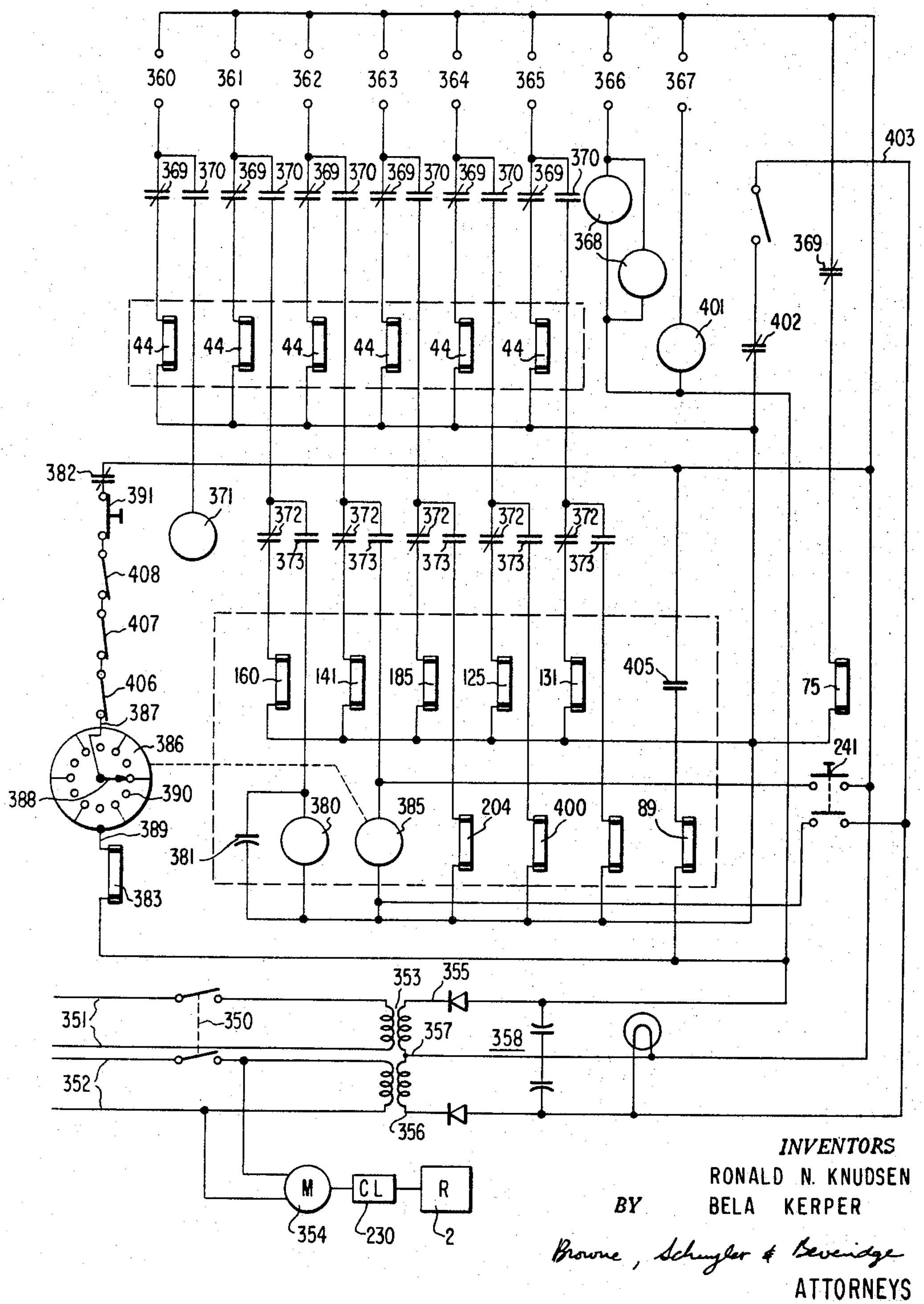
FIG. 17 is a schematic diagram of the converter and reader control circuitry.

As will be explained below in connection with the FIGURE 17, reader 2 is effectively turned off for a fixed amount of time after each tabulation. This is necessary so that bits corresponding to a character which may be received immediately after a tabulation function is signalled will not be printed until after the end of the tabulation. In the preferred embodiment of this invention, the reader is effectively turned off for a length of time equal to a tabulation of fifty spaces on the typewriter. This amount has been chosen because nearly all tabulations are less than fifty spaces. However, as will be explained below, in the event greater tabulations are used, either the tabulations may be taken in two or more steps with the present design, or by minor circuit modification, longer single step tabulations may be allowed.

SHIFT FUNCTION SENSING AND CONTROL

Figure 9:
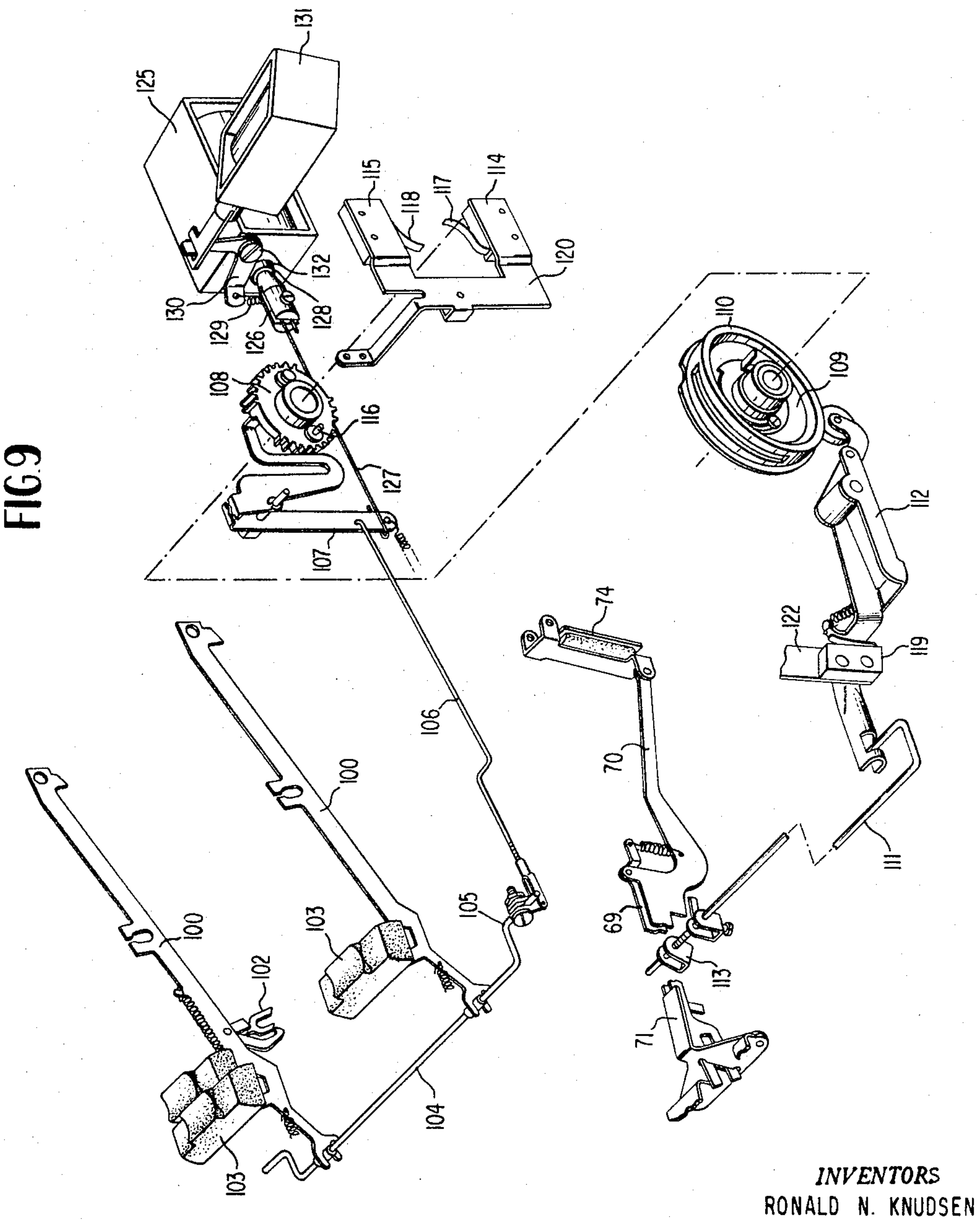
FIG. 9 illustrates the sensing and control devices for the shift function.

Normally, depression of a keyboard character key results in the printing of that character in lower case. When the printing of upper case characters is desired, it is necessary that the typewriter undergo a shift-up operation. The standard mechanism for accomplishing this shift-up is illustrated in FIGURE 9.

Depression of either of the shift keylevers 100 cause the typewriter to print upper-case characters. The shift mechanism may be locked in upper-case shift position by depression of lock key 101, causing shift lock 102 to engage. Depression of either of the shift keys 103 unlocks the shift mechanism and returns it to the lower case position.

Depression of either shift lever 100 causes shift bail 104 to pivot downwardly, rotating its end portion 105, thereby moving shift release link 106 toward the rear of the typewriter. When shift release arm 107 is thereby moved toward the rear of the typewriter, shift clutch ratchet 108 is released and undergoes a half-revolution. Shift cam 109 is attached to ratchet 108 and turns with it. Cam surface 110 on the face of shift cam 109 moves linkages which cause a one hundred and eighty degree turn of the typing head resulting in the printing of upper-case characters.

If the shift function has not been completed when a character key is depressed, the character cycle must be delayed until the shift function is ended. This is accomplished by character interrupter bail 111. As shift cam 109 begins its first half-revolution, shift detent arm 112 is revolved clockwise for a short distance. Character interrupter bail 111 thereby revolves counterclockwise, causing character interrupter pawl 113 to abut cycle clutch latch link 70. Interrupter pawl 113 stops the travel of latch link 70 towards the front of the machine until after the end of the shift function. Thereby the character cycle is not initiated until shift detent arm 112 causes character interrupter pawl 113 to pivot away from latch link 70. Character interrupter pawl 113 is rotated by shift detent arm 112 for both the shift-up and shift-down operations.

When shifting to the lower case positions from upper case, release of shift keylevers 100 cause shift release link 106 to move toward the keyboard of the typewriter. Shift clutch ratchet 108 then executes a second one-half revolution along with shift cam 109.

Sensing of shift-up and shift-down operations is accomplished by sensing switches 114 and 115. Shift clutch ratchet 108 is shown in FIGURE 9 in its upper case position. When shift key levers 100 are released, shift clutch ratchet 108 undergoes a counterclockwise one-half revolution. Striker pin 116 embedded in ratchet 108 then strikes actuator arm 117 of shift sensing switch 114, signalling a shift-down operation. On the next shift-up operation, striker pin 116 will be rotated by ratchet 108 through a half circle and will strike actuator lever 118 of shift sensing switch 115. Accordingly, all shift-up operations are sensed by sensing switch 115 and all shift-down operations are sensed by sensing switch 114.

As explained above, each shift-up and shift-down operation causes character interrupter pawl 113 to stop any movement of latch link 70 which may occur because of the depression of a character key before the shift function is completed. Shift delay sensing switch 119 is actuated by each partial revolution of shift detent arm 112. Operation of shift delay sensing switch 119 will be explained below in connection with the explanation of FIGURE 17.

Figure 8:
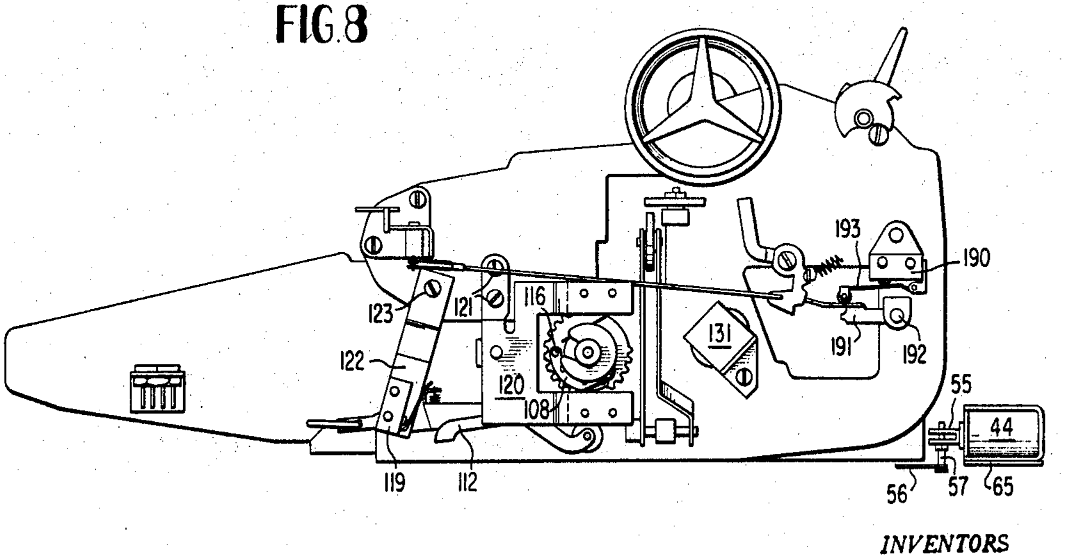
FIG. 8 is a view of the right side of the modified typewriter of this invention.

Shift sensing switches 114 and 115 are attached to shift sensing bracket 120 which is fixedly connected to the righthand side of the typewriter by screws 121 (FIGURE 8).

Shift delay sensing switch 119 is attached to switch mount 122, which is in turn fixedly connected to the righthand side of the typewriter by screw 123 (FIGURE 8).

Shift control devices are illustrated in FIGURE 9. When the control code received by the typewriter indicates that a shift-up operation is to be performed, shift-up solenoid 125 retracts plunger 126, which is attached to shift release arm 107 by shift line 127. This movement of shift release arm 107 causes a shift-up operation to be initiated in the normal manner. Plunger 126 is provided with recess 128 around its circumference. When plunger 126 is retracted by shift-up solenoid 125, spring 129 pulls L-shaped locking pawl 130 into recess 18, locking plunger 128 in the shift-up position. When the incoming code indicates that a shift-down function be performed, shift-down solenoid 131 is actuated, causing locking pawl 130 to rotate clockwise about its pivoting screw 132, thereby releasing plunger 126 and shift release arm 107. As in normal operation, the typewriter is thereby shifted into lower case operation.

It has been found that the shift-up operation must be accomplished as quickly as possible. Consequently, the pull of shift-up solenoid 125 is considerably higher than the value necessary to actuate the shift linkages. That is, while a 4–6 ounce pull would operate the linkages, a pull of at least 20 ounces is desirable.

In summary, shift clutch ratchet 108 rotates one-half turn for each shift-up and shift-down operation. Striker pin 116 closes shift-up sensing switch 115 on each shift-up operation and similarly actuates shift-down sensing switch 114 on each shift-down operation. Switch delay sensing switch 119 turns off reader 2 for the duration of each shifting operation so that a character cycle will not be initiated until after the conclusion of each shift function.

Control of the shift function is accomplished by solenoids 125, 131. Solenoid 125 is energized to control a shift-up function and is locked in place by L-shaped pawl 130. Shift-down solenoid 131 causes solenoid 125 to be released and initiates a shift-down function.

BACKSPACE FUNCTION SENSING AND CONTROL

Figure 10:
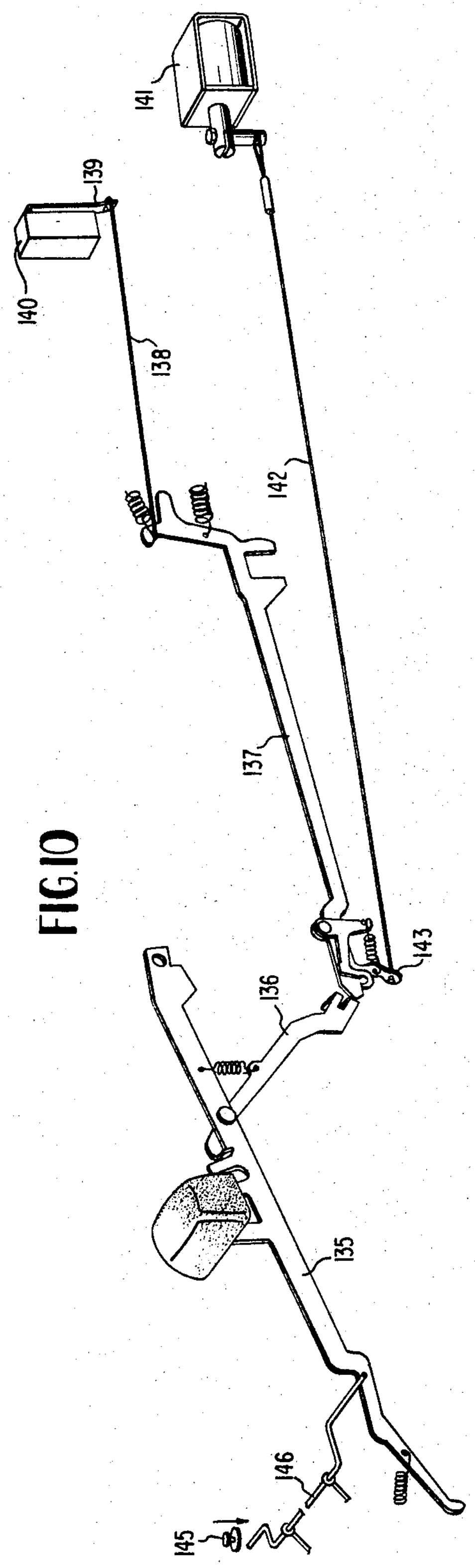
FIG. 10 illustrates the standard backspace function linkage and the sensing and control devices therefore.

Standard mechanisms for causing the backspace function on the typewriter may be seen in FIGURE 10. Backspace key lever 135 is depressed to initiate the backspace function during normal typing operations. The resultant downward movement of key lever pawl 136 causes backspace interposer 137 to be moved toward the rear of the typewriter. Each backspace function is accompanied on the standard machine by the rearward movement of back space interposer 137. Backspace sensing link 138 connects interposer 137 to actuator arm 139 of backspace sensing switch 140. Each backspace function causes switch 140 to close, signalling the function to the system's output.

Control of the backspace function in response to received code is accomplished by backspace solenoid 141. When solenoid 141 is energized, control line 142 is pulled to the right in FIGURE 10 thereby moving interposer 137 through its connection 143 thereto. Thereafter, the backspace function is accomplished within the machine in the ordinary manner.

As will be explained below in connection with the erase feature of this invention, depression of the erase button 145 positioned to the left of the typewriter keyboard causes bail 146 to depress key lever 135 and initiate a backspace function.

SPACING FUNCTION SENSING AND CONTROL

Figure 11:
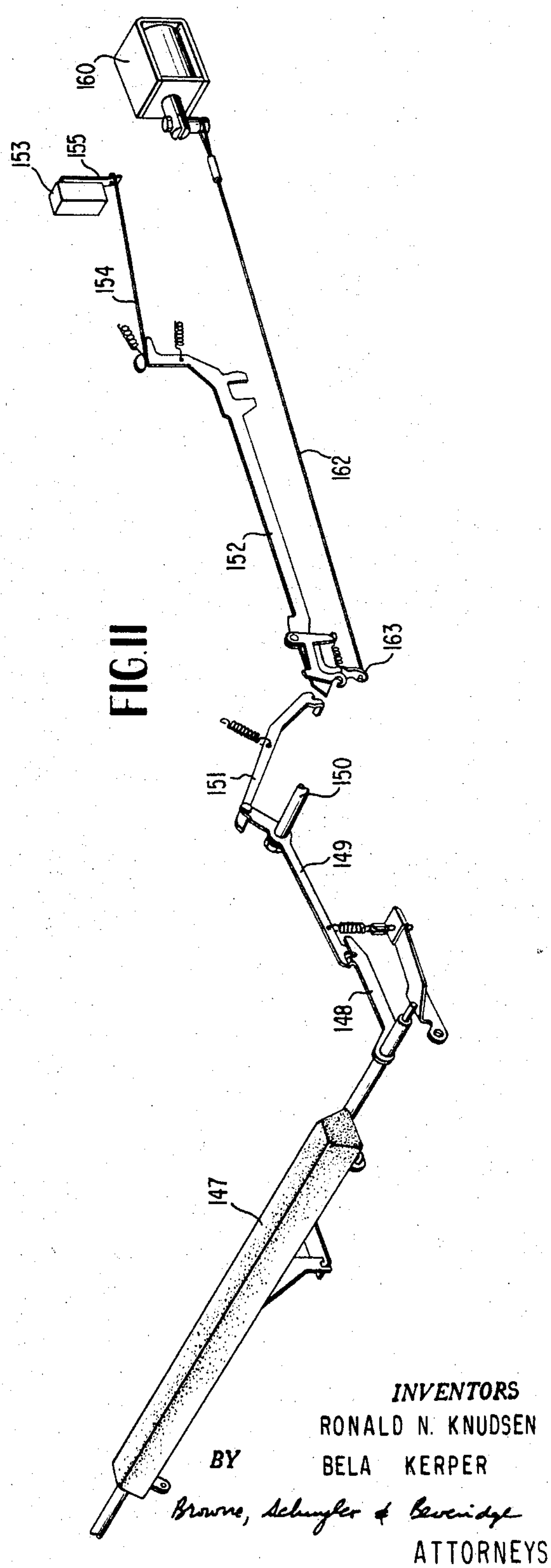
FIG. 11 illustrates the standard spacebar function linkage and the sensing and control devices therefor.

Standard mechanisms for causing spacing functions are illustrated in FIGURE 11. Depression of space bar 147 causes space bar operating arm 148 to pivot upwardly, rotating space bar lever 149 clockwise about lever shaft 150. Space bar level pawl 151 is thereby forced downward against the keyboard end of space bar interposer 152. Contact with interposer 152 initiates a spacing operation. For each spacing operation, space bar 152 moves away from the keyboard toward the back of the machine.

Sensing switch 153 is connected to space bar 152 via link 154. Each rearward movement of interposer 152 moves actuator arm 155 and closes switch 153, signalling a spacing function.

Control of the spacing function in response to received code is accomplished by spacing solenoid 160. Energization of solenoid 160 causes interposer 152 to be moved toward the back of the machine by spacing line 162, connected to interproser 152 at connection 163. Once movement of interposer 152 is initiated, the spacing function goes forward in a normal manner.

CARRIER RETURN FUNCTION SENSING AND CONTROL

Figures 12, 13:
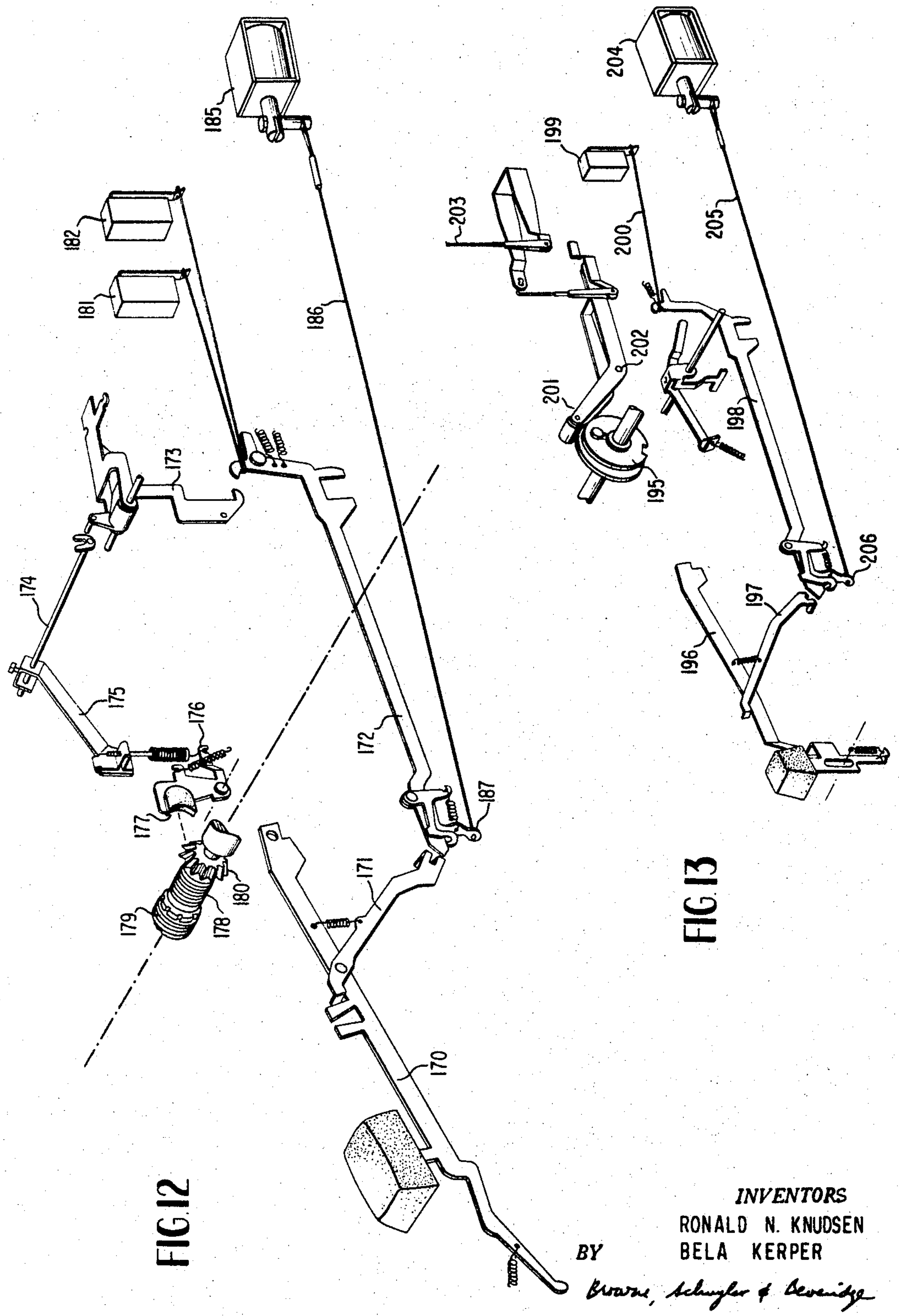
FIG. 12 illustrates the operation of the carriage return function mechanism and the sensing and control devices therefor.
FIG. 13 shows the standard index function linkage and the sensing and control devices associated therewith.

Portions of the standard typewriter carrier return linkage are illustrated in FIGURE 12. Depression of carrier return key lever 170 pushes carrier return pawl 171 into contact with carrier return interposer 172. On each carrier return function operation, interposer 172 travels through a short stroke toward the back of the typewriter (to the right in FIGURE 12). With each rearward movement of interposer 172, interconnecting linkages revolve pivot pin actuator 173 and pivot pin 174 connected thereto for a short distance in a clockwise direction. Carrier return clutch arm 175 raises actuating arm 176, forcing carrier return shoe 177 into contact with clutch spring 178. Shaft 179 is constantly being rotated by the type drive motor. Shoe 177 causes spring 178 to wind about a rear shoulder of bevel gear 180, causing the bevel gear to revolve. Bevel gear 180 controls the winding mechanism (not shown) that causes the carrier to traverse across the typewriter from right to left.

Sensing of the beginning of the carrier return operation is accomplished by sensing switches 181 and 182. Lines 183 interconnect carrier return interposer 172 with actuating arms of each of the sensing switches 181, 182. For each carrier return operation, sensing switches 181 and 182 are actuated.

Control of the carrier return operation in response to received code is accomplished by carrier return solenoid 185. When the received code indicates a carrier return operation, converter 3 causes return solenoid 185 to be energized. Interposer 172 is thereby pulled toward the back of the machine by connecting line 186 attached to the interposer at connection 187. Carrier return solenoid 185 is mounted on solenoid mounting plate 65 (FIGURE 3).

A finite time is required for the carrier to traverse the typewriter from right to left. During this time, it is imperative that no further code signals be transmitted to the typewriter from reader 2. Accordingly, reader 2 is effectively shut off during the time the carrier is returning to the left margin of the machine. The second delay switch 190 is illustrated in FIGURE 8. At the beginning of the carrier return operation, pivot arm 191 drops downward, pivoting counterclockwise about shaft 192. When the carrier reaches the left hand margin, pivot arm 191 returns to the position shown in FIGURE 8. Accordingly, actuator arm 193 of delay switch 190 rests upon pivot arm 191 when the latter is in its upward position. When a carrier return function is initiated, pivot arm 191 moves downward, allowing actuator arm 193 to open switch 190. At the conclusion of the carrier travel, pivot arm 191 moves upward in a clockwise direction again closing delay switch 190. It is to be noted that switch 190 is open for the duration of the carrier return cycle, regardless of the length of the return. That is, if the carrier is at a halfway position when the carrier return key lever is depressed, sensing switch 190 will disconnect reader 2 only for the exact length of time required to return the carrier to the left side of the machine. The operation of the switch 190 and switches 181 and 182 will be explained in greater detail in connection with the discussion of FIGURES 16 and 17.

Each carrier return function is accompanied by an index function operation. In this way, each time the carrier is returned to the left margin to begin a new line, the typing surface is indexed upward one or more spaces. Every time the carrier return key lever 170 is depressed, index cam 195 (FIGURE 13) is caused to revolve one complete turn. This indexing operation is sensed in the usual manner, which will be discussed in the following section.

INDEX FUNCTION SENSING AND CONTROL

Referring to FIGURE 13, a portion of the standard mechanism causing an index operation is illustrated. Depression of index key lever 196 causes index pawl 197 to contact index interposer 198 and cause it to be tripped and pushed toward the rear of the machine for a short distance. Interposer 198 is connected to index sensing switch 199 via link 200. Each rearward excursion of interposer 198 is sensed by switch 199.

Interconnecting linkage cause index cam 195 to revolve one complete turn each time index key lever 196 is depressed. Index bell crank 201 is caused to rock about pivot pin 202, causing index link 203 to be pulled downward. Downward travel of index link 203 causes an indexing pawl (not shown) to rotate the printing platen one or more spaces.

Control of the indexing function in response to received code is initiated by indexing solenoid 204. Each time solenoid 204 is energized, interposer 198 is drawn toward the rear of the machine by line 205 and connection 206. Thereafter, the indexing function proceeds as in normal keyboard operation.

READER AND PUNCH SPRING CLUTCHES

Figure 14:
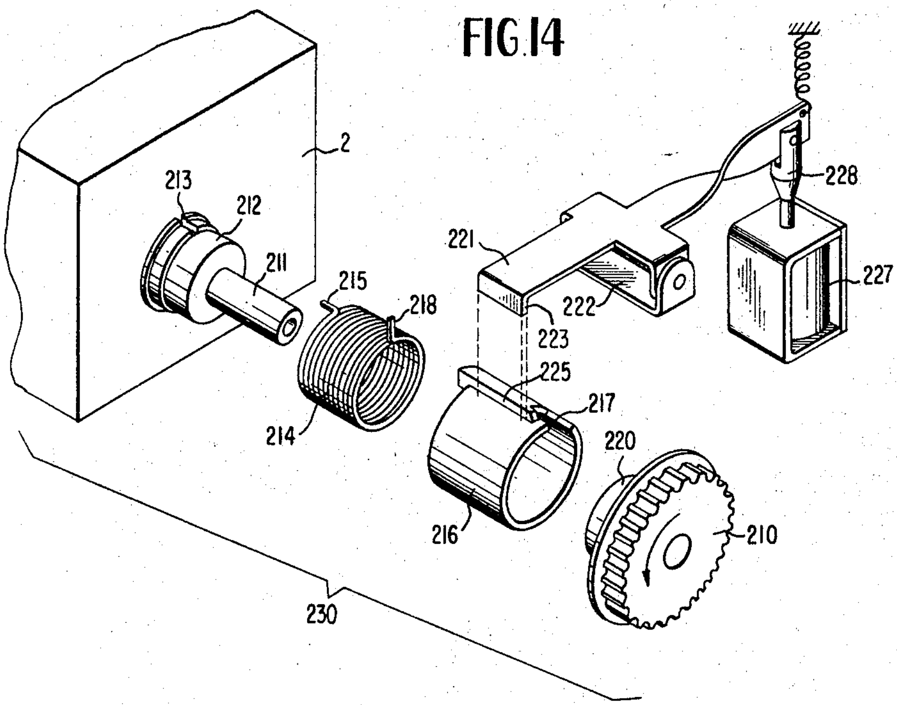
FIG. 14 is an exploded view of the spring clutch associated with the tape reader.

FIGURE 14 illustrates an exploded view of the components of the reader spring clutch. As explained above, there are instances during the operation of the typewriter of this invention when it is necessary to stop the reader from sensing further codes in the punched tape. An example of this is during the time involved for tabulation or carrier return. During the times when reader sensing is to stop, the clutch illustrated in FIGURE 14 is actuated, disconnecting the reader from the drive mechanism.

Referring to FIGURE 14, drive sprocket 210 is connected to a driving motor (not shown) by a flexible belt (not shown). The motor causes drive sprocket 210 to rotate in a counterclockwise direction, as shown. Reader 2 is powered by an outwardly projecting drive shaft 211 upon which is fixedly mounted collar 212. Spring notch 213 is cut into one point of collar 212 to receive end portion 215 of clutch spring 214. Sleeve 216 surrounds the clutch spring and is provided with slot 217 through which radial spring end portion 218 projects. Drive sprocket 210 is provided with shoulder 220 on the side facing the reader, shoulder 220 being slightly smaller than the internal diameter of clutch spring 214.

Rotation of drive sprocket 210 in the direction shown would tend to wind clutch spring 214 about shoulder 220, thereby coupling rotational motion through reader driving shaft 211. However, sleeve 216, if held in the position shown, prevents clutch spring 214 from winding around sleeve 220 since radial projection 218 can travel only within notch 217. If sleeve 216 is allowed to rotate with the rest of the assembly, however, clutch spring 214 immediately winds tight about shoulder 220, interconnecting drive sprocket 210 and reader drive shaft 211.

Reader clutch pawl 221 is pivotally mounted on bracket 222. Counterclockwise rotation of clutch pawl 221 causes tip 223 of the pawl to hold sleeve 216 from rotation by impacting against stop 225 of sleeve 216.

Reader clutch pawl bracket 222 is mounted relative to sleeve 216 so that pawl 221 holds clutch spring 214 in a slightly unwound condition.

Under normal conditions, reader 2 is sensing code perforations in a punched tape and feeding the code impulses to converter 3. Accordingly, under normal conditions, drive sprocket 210 is connected to reader drive shaft 211 through clutch spring 214. At times when it becomes necessary to stop reader 2 from sensing further codes, solenoid 227 is actuated. Plunger 228 is forced upward, causing tip 223 of pawl 221 to contact stop 225 and cause clutch spring 214 to be slightly unwound, thereby disconnecting reader drive shaft 211 from the motor. Unlike the rest of the solenoids of this invention, solenoid 227 pushes its plunger 228 outward rather than pulling it inward.

Figure 15:
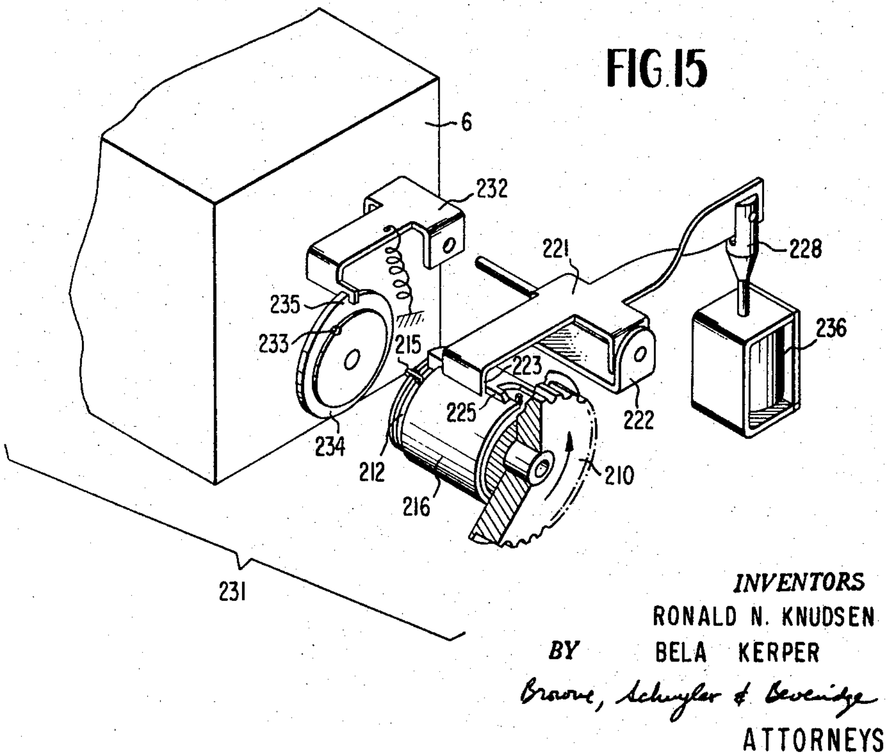
FIG. 15 is a partially exploded view of the spring clutch associated with the tape punch.

Punch spring clutch 231 is illustrated in FIGURE 15. It is similar in construction to reader clutch 230 and parts in FIGURE 15 have been given the same numbers as like parts in FIGURE 14. Unlike the reader, it is absolutely essential that the punch start each punching cycle at an exact angular position of the drive mechanism. For this purpose, an additional pawl 232 has been added. Pawl 232 is pivotally mounted on the same shaft as pawl 221.

End portion 215 of clutch spring 214, in addition to lying within notch 213 of collar 212, is inserted in aperture 233 of disc 234. Disc 234 is provided with a raised stop portion 235 which strikes the tip of pawl 232, preventing backward rotation of the punch drive.

In normal operation, punch 6 is turned on for only short periods of time. Accordingly, for the majority of the time, pawl 221 will be in the position shown in FIGURE 15, maintaining clutch spring 214 slightly unwound, and maintaining punch 6 at rest. When depression of a typewriter key requires a code to be punched in a tape, solenoid 236 is actuated, pulling plunger 228 in and releasing sleeve 216. The punch will then rotate one complete turn until stop 225 again impacts end portion 223 of pawl 221. At the same time, pawl 232 drops behind raised portion 235 of disc 234 to insure that the punch does not back up.

TAPE CODE

Referring to FIGURE 2, character and function code, entitled Kerper code, is disclosed for use with the preferred embodiment of tape reader and tape punch of this invention. In addition to sprocket drive holes 9, tape 8 has eight possible channels for receiving data bits. All characters, both upper case and lower case, are coded into a combination of channels 1 through 6. Channel 7 is reserved for all typewriter functions. Each function is represented by a channel 7 perforation plus a perforation in one or more of the channels 1 through 6. In the event a typing error ocurs while punched tape is being prepared, the tape is backed up to the proper point and a perforation placed in channel 8. Converter 3 ignores all data punches which are accompanied by a channel 8 perforation.

Perforation of a punched tape with typewriter 1 requires the coding of a number of special functions. For example, if the tape being prepared is to be used to generate "form letters" in the future, it is necessary to insert at a later date certain items in each form letter that are unique to the addressee, such as his address. This is provided for by the "stop code." For example, if the form letter was to have a personal salutation, such as "Dear John," the word "Dear" would be punched in the tape in the normal manner. Then button 240 on the left-hand side of the typewriter case would be depressed, causing a "stop code" to be punched in the tape following the word "Dear." When later fed to tape reader 2, this would cause a controlled typewriter to type the word "Dear" and no more, the reader stopping immediately thereafter. The operator would then normally type in "John" on the keyboard to personalize the letter. Then, button 241 on the right-hand side of the typewriter case would be depressed to restart the tape reader and complete the remainder of the letter.

As mentioned in the introductory portion of this specification, it is possible with the preferred embodiment of this invention to sequentially or selectively switch between tape readers to interleave contents of a number of punched tapes or data sources. Depression of button 242 on the left side of the typewriter case causes punching device 6 to punch the "reader shift" code in the tape being prepared at the proper point. Converter 3 would then receive data from a second tape reader.

Correction of an improperly typed character is carried out in the following manner. As a typist is preparing a punched tape, she stops typing when she notices a typing error. She first backspaces and aligns the carrier over the last error by depressing the erase key. Referring to FIGURE 10, it is seen that depression of erase button 145 also causes backspace key lever 135 to be depressed, backspacing the carrier one space.

INVERTER AND PUNCH CONTROL CIRCUITRY

Figure 16:
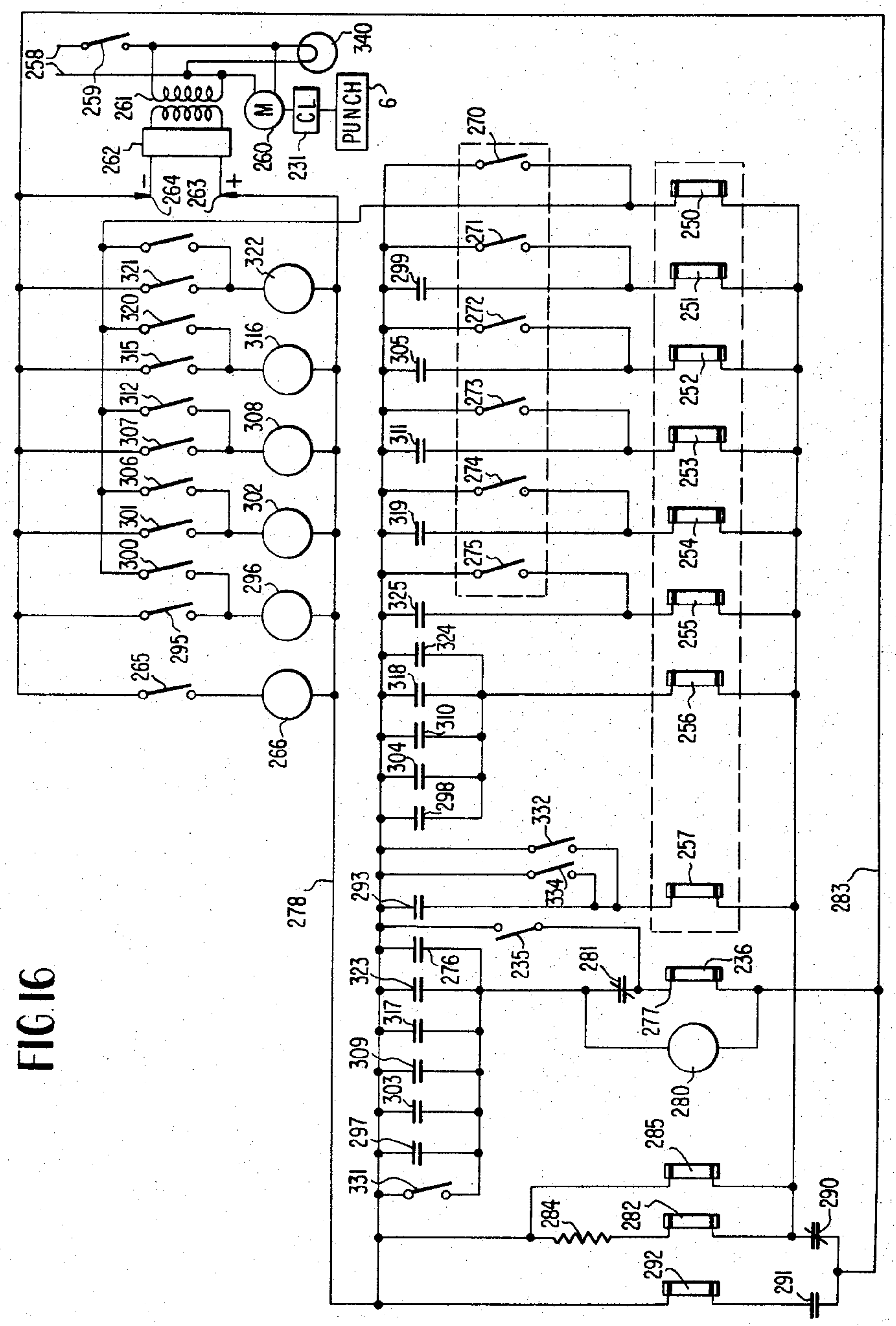
FIG. 16 is a schematic diagram of the inverter and punch control circuitry.

Control circuitry associated with punch 6 and the circuitry of inverter 5 is illustrated schematically in FIGURE 16. Power is connected to the punch and inverter circuitry by 110-volt power lines 258. On-off switch 259 serves to connect line voltage to both the punch motor 260 and the punch input transformer 261. In the preferred embodiment, on-off switch 259 is located on the punch housing. Punch input transformer 261 is a step-down transformer delivering 24 volts at its secondary. Full-wave rectifier and filter 262 is of conventional design and supplies a positive 24-volt voltage level to punch input terminal 263 and a negative level, or ground, to punch input terminal 264. After on-off switch 259 is closed, power is continually delivered to the entire inverter and punch control circuitry through transformer 261. Also, motor 260 is continually rotating the motor side of clutch 231. As explained in connection with FIGURE 15, clutch 231 is generally open, leaving punch 6 at rest.

Solenoids 250 through 257 control the punching of channels 1 through 8 of the tape, respectively. That is, actuation of solenoid 252 causes a perforation to be punched in channel 3 of the tape.

Referring to FIGURE 1, erase button 145 on the type writer case closes switch 265 of FIGURE 16, causing operation of erase relay 266.

Referring to FIGURE 4, sensing switches 34, 40 operate switch contacts 270 through 275 of FIGURE 16. That is, switch 40, the 5-Unit cam bail switch, operates switch 275. The switch adjacent to it, number 34 in FIGURE 4, operates switch 274, and so on, consecutively. Switch 74 of FIGURE 4, which closes for each character cycle, operates contacts 276 in FIGURE 16. Solenoid 236 actuates punch spring clutch 231 of FIGURE 15. Accordingly, whenever upper terminal 277 of solenoid 236 is connected to positive line 278 through any contact, punch 6 is connected to motor 260 through clutch 231 and any of the solenoids 250 through 256 may punch a code combination at that tape position. For example, if, in the operation of the differential system of FIGURE 4, the first and last selector latches are selected due to character key "H" being depressed on the keyboard, then switches 275 and 270 will close, causing solenoids 255 and 250 to operate, punching holes in channels 1 and 6 of the tape. At the same time that switches 275 and 270 are closed, contact 276 is closed by the cycle sensing switch 74 of FIGURE 4. Voltage is then applied to solenoid 236 through switch 276 and motor power is applied to punch 6 through clutch 231. At the same time that voltage is applied across solenoid 236, it is also applied across braking relay 280, causing contact 281 to open. Accordingly, solenoid 236 is supplied current for only a fraction of a second before braking relay 280 opens contacts 281 and removes the voltage applied across solenoid 236 through contacts 276. All character selections work in a similar manner, causing the interaction between switches 270 through 275, contacts 276, solenoid 236 and relay 280.

Within the tape advancing mechanism, provision is made for driving the tape either forward or backward. Solenoid 282 is normally connected between positive line 278 and negative line 283. Accordingly, under normal conditions, the punch will be advanced in the forward direction. Resistor 284 is a current liimting 300-ohm resistor placed in series with forward solenoid 282 to prevent any possible heat damage.

Also, solenoid 285, which controls perforation of sprocket hole 9 (FIGURE 2), is generally connected to the positive and negative lines 278, 283. Therefore, under normal circumstances, solenoid 282 will cause the tape to advance during each cycle and solenoid 285 will cause the punch to perforate sprocket feed holes during each cycle.

Erase button 145 (FIGURE 1), located on the left-hand portion of the typewriter case, controls contacts 265 and the operation of erase relay 266. If an erase step becomes necessary, the operator presses button 145, thereby closing switch 265 and energizing relay 266. Relay 266, in turn, opens normally closed switch 290 and closes normally open switch 291. Opening of switch 290 takes forward solenoid 282, sprocket hole solenoid 285 and punching solenoids 250 through 257 off the line. Solenoid 292 is a reversing solenoid and causes the punch to back one code position when energized. Release of erase button 145 causes switches 290 and 291 to return to their normal condition.

Space function sensing switch 153 (FIGURE 11) closes contacts 295 and energizes relay 296. Energization of relay 296 closes contacts 297, 298, and 299, causing perforations to be punched in channels 2 and 7 of the tape, corresponding to the "space bar" code of FIGURE 2.

Operation of sensing switch 86 (FIGURE 7) closes contacts 300, also causing relay 296 to be energized. In addition to channels 2 and 7 which were punched by the sensing switch associated with the space bar, switch 300 also causes a punch in channel 1 by solenoid 250.

Sensing switch 140, which closes for each backspace function operation (FIGURE 10), controls contacts 301 and a relay 302. Energization of relay 302 closes contacts 303, 304 and 305. Solenoids 252 and 256 are consequently energized, causing perforations in channels 3 and 7.

Switch 240, located on the left-hand side of the typewriter case (FIGURE 1), is pressed when a "stop code" is to be punched in the tape. Depression of switch 240 closes contacts 306, energizing relay 302 and causing a perforation in channels 3 and 7 as before and additionally energizing solenoid 250 to cause a perforation in channel 1.

Referring to FIGURE 12, sensing switch 182 is closed for each initiation of a carrier return function cycle. Switch 182 controls contacts 307 and energization of relay 308. Relay 308 closes contacts 309, 310 and 311. Solenoids 253 and 256 are thereby energized, causing perforations to be punched in channels 4 and 7.

As disclosed in FIGURE 13, each index function cycle is sensed by switch 199. Actuation of switch 199 closes contacts 312, again energizing relay 308. This generates perforations in channels 4 and 7, as above, and additionally energizes solenoid 250 to cause a perforation to be placed in channel 1.

Each shift-up operation is sensed by switch 115 (FIGURE 9). Actuation of this switch closes contacts 315 and energizes relay 316. Relay 316 closes switches 317, 318, and 319. Consequently, channels 5 and 7 are perforated by solenoids 254 and 256, respectively.

Depression of button 242 on the left side of the typewriter causes a "reader shift" code to be punched in the tape. Depression of this button closes contacts 320, energizing relay 316 as above. Consequently, the same channels are punched with the addition of channel 1 by solenoid 250.

Each shift-down operation is sensed by switch 114 in FIGURE 9. Operation of switch 114 closes contacts 321 and energizes relay 322. Relay 322, in turn, closes contacts 323, 324, and 325. Accordingly, channels 6 and 7 are perforated under control of solenoids 255 and 256, respectively.

Depression of key 330 on the left side of the typewriter case causes the punch to skip forward one space. Depression of switch 330 closes contacts 331 and 332. Closure of contacts 331 cause solenoid 236 to actuate clutch 231 for one revolution. Closure of contacts 332 cause a perforation to be punched in channel 8 under control of solenoid 257.

The punch can be made to feed for more than one cycle by depression of button 333 on the left side of the typewriter case. Button 333 controls contacts 334 and 335. Since closure of contacts 335 by-passes the contacts of braking relay 280, solenoid clutch 231 is actuated for as long as button 333 is held depressed.

So that the user of the typewriter system of this invention will know that punching device 6 is turned on, an indicator light 340 is connected across the input leads to the punch circuitry and displayed on the left-hand side of the typewriter case (FIGURE 1).

READER CONTROL CIRCUITRY AND CONVERTER CIRCUITRY

As discussed above, the typewriter of this invention may be controlled by prepunched data tape fed to tape reader 2. To control the system from data tape, the operator turns on the reader circuitry (FIGURE 17) by closing switch 350 which connects two 110-volt power lines 351, 352 to the primary side of reader input transformer 353. The same switches supply line current to motor 354 which turns sprocket 210 (FIGURE 14) continuously. Transformer 353 delivers −24 volts at terminal 355 of its secondary for circuit control purposes. Terminal 356 delivers −24 volts to the circuit for power purposes. Common terminal 357 is at a positive level, 24 volts above the other two secondary terminals. Full wave rectifier 358 converts the 24-volt AC to 24-volt DC in well-known fashion. Indicator bulb 359, located on the right side of the typewriter case (FIGURE 1), signals the typewriter operator that the reader circuitry is turned on.

Brushes 360 through 367 sense tape channels 1 through 8, respectively. That is, if only channel 4 is perforated, only brush 363 will make contact.

Brush 366 senses the presence or absence of perforations in channel 7. If a perforation is detected in channel 7, relays 368 are energized. Energization of relays 368 open normally closed switches 369 and close normally open switches 370.

Solenoids 44, energize through normally closed switches 369, are the keyboard character control solenoids (FIGURE 5). As pointed out above, any keyboard function code has a perforation in channel 7. All keyboard characters are coded in channels 1 through 6 only. Accordingly, relays 368 serve to recognize the distinction between keyboard function and keyboard character by sensing channel 7. If there is no channel 7 perforation, indicating a keyboard character, sensed impulses are routed directly to control solenoids 44. If a perforation appears in channel 7, however, relays 368 remove solenoids 44 from the line and shunt sensed signals into the stages below.

Functions having codes including a perforation in channel 1 energize relay 371 from brush 360. Energization of relay 371 opens normally closed contacts 372 and closes normally open contacts 373.

Solenoid 160 is energized when perforations appear in channels 2 and 7. As illustrated in FIGURE 11, solenoid 160 actuates the space function.

Solenoid 141, energized when perforations appear in channels 3 and 7, controls the backspace function as illustrated in FIGURE 10.

Solenoid 185, energized when there are perforations in channels 4 and 7, controls the carrier return function as illustrated in FIGURE 12.

Solenoid 125, energized when there are perforations in channels 5 and 7, controls the shift-up operation as illustrated in FIGURE 9.

Solenoid 131, energized by perforations in channels 6 and 7, control the shift-down operation.

Perforations in channels 1, 2 and 7 initiate a tabulation function. A perforation in channel 7 energizes relay 368, removing the keyboard control solenoids 44 from the line. Perforations in channel 1 energize relay 371 which closes contacts 373 and energizes tab relay 380. Capacitor 381, having a capacitance of 100 microfarads, is placed in parallel with tab relay 380. Capacitor 381 acts as a storage capacitor, serving to maintain energization of relay 380 until the capacitor discharges through the relay coil. Tab relay 380, when energized, opens normally closed contacts 382 and shuts power off from reader clutch solenoid 383 for a predetermined length of time. With a 100 microfarad capacitor shunting relay 380, the reader is effectively shut down for the length of time required for the carrier to tabulate a total of 50 typewriter spaces. If a greater tabulation delay is desired, a larger capacitor may be used in parallel with relay 380. Of, if variable tabulator delays are desired, provision may be made to switch different capacitors and/or resistors in and out of parallel connection with relay 380. As discussed elsewhere herein, the purpose of the tabulation delay is to effectively turn the reader off until the carrier has reached the end of its travel so that no character cycles will be initiated while the carrier is moving. Tab relay also closes normally open contacts 405, energizing solenoid 89 which controls the tabulation function, as illustrated in FIGURE 7.

As discussed above, it is sometimes desirable to insert a "stop code" at a particular point in the punched tape so that the typewriter will stop reading, allowing the insertion of manually typed information. If perforations appear in channels 1, 3, and 7, relay 385 will become energized. Relay 385 is a rotatable type and serves to step distributor 386 one position clockwise. That is, in the position shown, reader clutch solenoid 383 can be energized because distributor terminal 387 is connected through rotor 388 to opposite distributor terminal 389. When relay 385 is pulsed, however, rotor 388 is stepped one position, for example, to contact 390, which produces an open circuit. Accordingly, each time a "stop code" is sensed by the reader, the reader is turned off by rotatable relay 385 stepping distributor rotor 388 to an open circuit contact, such as 390. The typewriter operator then inserts whatever information is needed. To start the reader operating again, the operator depresses start button 241 on the right-hand side of the typewriter case which energized rotatable relay 385 a second time, causing it to again step distributor rotor 388 one position. At this time rotor 388 is connected to a contact which can deliver current to reader clutch solenoid 383 and start the reader operating again.

Button 390, located on the right-hand side of the typewriter case, will stop the reader as long as it is depressed by removing current from the reader clutch solenoid. Contact 391 is normally closed but is opened when depressed.

Solenoid 204 is actuated in response to perforations being sensed in channels 1, 4 and 7. Solenoid 204 controls the indexing function as disclosed in FIGURE 13.

Solenoid 400 is actuated when perforations in channels 1, 5 and 7 are sensed. This solenoid is made operable when the typewriter is to begin receiving data from another reader.

Solenoid 75 is energized for all reader cycles except when perforations in channel 7 are sensed. Channel 7 relays 368 open normally closed switch 369, taking solenoid 75 off the line whenever there is a perforation in channel 7. Accordingly, solenoid 75 will be energized whenever a character cycle is being sensed. Solenoid 75 controls actuation of the cycle bail and cycle clutch as illustrated in FIGURE 6.

Perforations sensed in channel 8 by brush 367 indicate that the reader is to ignore all other perforations at that position and simply feed. Perforations in channel 8 energize relay 401 which opens normally closed contacts 402 and removes negative line 403 from the reader circuit. In this way, the reader circuit is shut off for each channel 8 perforation.

As discussed above in relation to FIGURE 13, each initiation of a carrier return function operates switch 181 at the beginning of the carrier return. In addition, referring to FIGURE 8, switch 190 is opened shortly after the initiation of the carrier function and is held open until the carrier has returned to the far left margin. It is imperative that no signals be read from the reader when a carrier function is in progress. Switch 181, which opens at the exact time a carrier return function is begun, opens contacts 406, disabling reader clutch solenoid 383. Shortly after switch 181 is actuated, relay switch 190 (FIGURE 8) is also actuated. Switch 190 opens contacts 407 for the duration of the carrier function. Accordingly, for the entire carrier function, either switches 406 or 407 are open, disabling reader clutch solenoid 383, thereby insuring that no further codes are fed to the typewriter from the reader.

As discussed above in connection with FIGURE 9, the reader must also be disabled during each shift-up and shift-down interval. Delay switch 119 (FIGURE 9) is closed during each such interval. Switch 119 opens contacts 408 during each shift-up and shift-down interval, removing reader clutch solenoid 383 from the line. As above, this insures that no codes will be delivered to the typewriter during a shift-up or shift-down interval.

CONCLUSION

As may readily be appreciated, minor changes may be made from the circuits and structures disclosed herein without departing from the spirit of this invention. The exact form of this invention is dictated by the precise structures being utilized in the particular typewriter modified. Inasmuch as the manufacturer of the typewriter changes model designs slightly from time to time, it may become necessary to make minor changes and adjustments in the mechanisms and circuits disclosed herein. Such changes and adjustments, however, are not intended to depart from the spirit of the invention disclosed and claimed herein.

In the event that it becomes necessary to obtain more detailed disclosure concerning the precise structure of the typewriter discussed herein, reference is made to International Business Machines Corporation publication No. 241-5032-0, copyrighted in 1961, and entitled "IBM Customer Engineering, Series 72, Instruction Manual."

As noted in the introductory portions of this specification, a major advantage of this invention is that the modified typewriter takes up almost no more space on an operator's desk top than does a standard model. All sensing and control circuits and devices are built into the standard typewriter case. Since all connections between the typewriter and the invention's input-output devices are electrical, such devices can be placed anywhere, such as in desk drawers or even a different room.

It is intended that this invention be limited only by the appended claims.

We claim:

1. In a typewriter of the type having a single element printing head, a bail movable during each character cycle and a plurality of latches, selective ones of which engage said bail for movement thereby during each of said cycles, the improvement comprising:

mounting means individually pivotally mounted on said bail adjacent corresponding ones of said latches; and sensor means individually mounted on said mounting means for selective actuation by arcuate movement of said bail, the particular sensors so actuated being determined by the selection or non-selection of corresponding ones of said latches during a character cycle of said typewriter.

2. The combination of claim 1, wherein:

said sensing means are equal in number to said latches.

3. The combination of claim 1, wherein said sensing means includes electrical sensor means for detecting which of said latches are connected and which are not connected to said bail during each character cycle.

4. The combination of claim 3, wherein said sensor means are electrical switches.

5. The combination of claim 3, wherein:

said mounting means are equal in number to said latches and are adjacent the latches which remain connected to said bail during each character cycle; and said sensor means corresponding to said latches which are not connected to said bail during each character cycle are adapted for operation by said bail during each character cycle.

6. The combination of claim 1, wherein:

said mounting means correspond in number to said latches and to said sensing means.

7. Apparatus for generating multi-bit electrical codes uniquely corresponding to each character typed by an electric typewriter;

said typewriter having a single element type head, a plurality of selector latches and an additional selector latch, means for selecting a unique combination of said selector latches for each character typed, a first pivotally mounted bail adapted to engage said plurality of selector latches, said first bail pivoting in response to actuation of each character key, unselected ones of said plurality of selector latches being engaged by said first bail for movement therewith, and a second pivotally mounted bail adapted to engage said additional selector latch and arranged to pivot only if said additional selector latch is selected for the character being typed;

said apparatus comprising:

a like plurality of mounting elements individually pivotally connected to said first bail, each of said mounting elements being adapted to engage one of the selector latches in said plurality of selector latches;

a like plurality of sensors, one of said sensors being mounted on each of said mounting elements for actuation by said first bail, each sensor being uniquely adapted to produce one bit of said multi-bit electrical code in response to the selection or non-selection of corresponding ones of said selector latches;

an additional mounting element; and an additional sensor mounted on said additional mounting element for actuation by said second bail, said additional sensor being adapted to produce one bit of said multi-bit electrical code in response to the selection or non-selection of said additional latch;

said selection or non-selection of said latches being dependent upon engagement or non-engagement of said bails by said latches;

said plurality of sensors and said additional sensor producing said multi-bit electrical code representing said unique combination of selected selector latches for each character typed.

8. The apparatus as recited in claim 7, wherein:

the selection of one of said selector latches removes said latch from a position of engagement with the corresponding mounting element, thereby allowing relative motion between said first bail and the sensor corresponding to said selected latch.

9. The apparatus as recited in claim 8, wherein:

said relative motion is detected by said sensor resulting in a change in the output of said sensor.

10. The apparatus as recited in claim 9, wherein:

each of said sensors is adapted to produce two alternative output signals, one indicating that the corresponding latch has been selected and the other indicating that said latch has not been selected.

11. The apparatus as recited in claim 10, wherein:

said sensors are microswitches each having an operating arm adapted to engage said first bail and said second bail respectively, wherein relative motion between said operating arms and said respective bails causes said microswitches to change their output signal.

12. The apparatus as recited in claim 7, wherein:

said plurality is one less than the number of bits in said multi-bit electrical code.

13. The apparatus as recited in claim 7, wherein:

each mounting element in said plurality of mounting elements includes a post adjacent the base of a correspondig selector latch when said latch is in its unselected position, whereby said mounting element is caused to pivot with said first bail thereby preventing a change from occurring in the output of the corresponding sensor.

14. The apparatus as recited in claim 13, wherein:

said plurality of mounting elements are biased toward said first bail to maintain said posts adjacent corresponding unselected selector latches.

15. The apparatus as recited in claim 14, wherein:

said second bail includes a pedestal which engages said additional selector latch when said latch is unselected, thereby preventing said second bail from moving relative to said additional sensor.

16. Apparatus for generating, recording and reading uniquely coded, multi-bit information signals corresponding to typewriter characters and functions, comprising:

an electric typewriter having a single element type head, a type head carrier, character and function keys including a backspace key, means responsive to actuation of said backspace key to cause said type head carrier to backspace, and an erase key;

means acting in response to the actuation of said character and function keys for generating said information signals;

a medium for receiving and recording said information signals in consecutively adjacent code spaces;

recorder means having a plurality of channel recorders including a skip-code channel recorder, said recorder means operating in response to said information signals to simultaneously record data in preselected channels of one code space of said medium which correspond uniquely to the character of function key actuated, said recorder means being adapted to advance said medium one code space for each recording operation, and being further adapted to reverse the direction of movement of said medium;

a reading device adapted to produce signals in sequence as said medium is advanced thereby, said signals being indicative of the data previously recorded on said medium in said consecutive code spaces;

means operative upon depression of said erase key to actuate said recorder means to drive said medium one code space in said reverse direction while simultaneously actuating said backspace key to cause said type head carrier to backspace one space;

means for causing said skip-code recorded to record a skip signal in said skip-code channel in any code space; and means responsive to a skip signal in said skip code channel in any code space for preventing said tape reading device from producing signals from any recorded information signals in that code space.

17. The apparatus recited in claim 16, and further comprising:

means operative upon depression of said erase key whereby said recorder means is prevented from recording information on said medium corresponding to signals generated by said information signal generating means in response to the aforesaid simultaneous actuation of said backspace key.

18. Apparatus for generating multi-bit electrical code signals uniquely corresponding to each character typed by an electric typewriter and for producing typed characters by said electric typewriter in response to said multi-bit electrical code input signals;

said typewriter having a single element type head, a plurality of selecteor latches and an additional selector latch, means for selecting a unique combination of said selector latches for each character typed, a first pivotally mounted bail adapted to engage said plurality of selector latches, said first bail pivoting in response to actuation of each character key, unselected ones of said plurality of selector latches being engaged by said first bail for movement therewith, and a second pivotally mounted bail adapted to engage said additional selector latch and arranged to pivoted only if said additional selector latch is selected for the character being typed;

said apparatus comprising:

a like plurality of mounting elements individually pivotally connected to said first bail, each of said mounting elements being adapted to engage one of the selector latches in said plurality of selector latches;

a like plurality of sensors, one of said sensors being mounted on each of said mounting elements for actuation by said first bail, each sensor being uniquely adapted to produce one bit of said multi-bit electrical code in response to the selection of corresponding ones of said selector latches;

an additional mounting element;

an additional sensor mounted on said additional mounting element for actuation by said second bail, said additional sensor being adapted to produce one bit of said multi-bit electrical code in response to the selection or non-selection of said additional latch; and a like plurality of solenoids and an additional solenoid fixed to said typewriter, the plunger of each of said solenoids being connected by a linkage to a respective one of said selector latches;

said selection or non-selection of said latches being dependent upon engagement or non-engagement of said bails by said latches;

said plurality of sensors and said additional sensor producing said multi-bit electrical code representing said unique combination of selected selector latches for each character typed;

the selection of one of said selector latches of said plurality of selector latches removing said latch from a position of engagement with the corresponding mounting element, thereby allowing relative motion between said first bail and the sensor corresponding to said latch, said relative motion being detected by said sensor resulting in a change in the output signal of said sensor;

said solenoids operating in response to input signals in the form of said multi-bit electrical code to select the combination of selector latches corresponding to the unique multi-bit electrical code of the character to be typed, whereby said typewriter is conditioned to type said character.

References Cited

UNITED STATES PATENTS

| | | | |
|---|---|---|---|
| 2,346,819 | 4/1944 | Buckley | 197—20 |
| 2,543,435 | 2/1951 | Buckley | 197—20 XR |
| 2,879,876 | 3/1959 | Palmer et al. | 197—16 |
| 2,919,002 | 12/1959 | Palmer | 197—16 |
| 2,924,321 | 2/1960 | Ziskind et al. | 197—19 |
| 2,978,086 | 4/1961 | Hickerson | 197—16 |
| 3,001,630 | 9/1961 | Dodge et al. | 197—71 XR |
| 3,045,795 | 7/1962 | Morrison et al. | 197—20 |
| 3,050,241 | 8/1962 | Hickerson | 197—30 XR |
| 3,063,540 | 11/1962 | Howard | 197—49 |
| 3,082,854 | 3/1963 | Becker et al. | 197—19 |
| 3,165,190 | 1/1965 | Wenczel | 197—19 |
| 3,227,259 | 1/1966 | Howard | 197—19 |
| 3,233,715 | 2/1966 | Flieg | 197—19 |
| 3,249,199 | 5/1966 | Jones | 197—19 |
| 3,353,744 | 11/1967 | Becking et al. | 197—20 XR |

ROBERT E. PULFREY, *Primary Examiner.*

E. S. BURR, *Assistant Examiner.*

UNITED STATES PATENT OFFICE
CERTIFICATE OF CORRECTION

Patent No. 3,414,103

December 3, 196

Ronald N. Knudsen et al.

It is certified that error appears in the above identified patent and that said Letters Patent are hereby corrected as shown below:

Column 8, line 47, "18" should read -- 128 --. Column 9, line 67, "type" should read -- typewriter --. Column 13, line 30, "contact" should read -- contacts --. Column 16, line 57, "relay" should read -- delay --. Column 19, line 50, "selecteor" should read -- selector --. Column 20, line 6, after "tion" insert -- or non-selection --.

Signed and sealed this 10th day of March 1970.

(SEAL)
Attest:

Edward M. Fletcher, Jr.
Attesting Officer

WILLIAM E. SCHUYLER, JR.
Commissioner of Patents